US011244626B2

(12) United States Patent
Kim et al.

(10) Patent No.: US 11,244,626 B2
(45) Date of Patent: Feb. 8, 2022

(54) DISPLAY DEVICE

(71) Applicant: SAMSUNG DISPLAY CO., LTD., Yongin-si (KR)

(72) Inventors: Sung Chul Kim, Yongin-si (KR); Sung Gyu Kim, Yongin-si (KR); Mi Young Park, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/801,895

(22) Filed: Feb. 26, 2020

(65) Prior Publication Data

US 2020/0294450 A1 Sep. 17, 2020

(30) Foreign Application Priority Data

Mar. 14, 2019 (KR) ........................ 10-2019-0029266

(51) Int. Cl.
*G06F 1/00* (2006.01)
*G09G 3/3266* (2016.01)

(52) U.S. Cl.
CPC ... *G09G 3/3266* (2013.01); *G09G 2320/0233* (2013.01); *G09G 2320/0626* (2013.01)

(58) Field of Classification Search
None
See application file for complete search history.

(56) References Cited

U.S. PATENT DOCUMENTS 7,791,652 B2 9/2010 Mitsunaga
8,482,509 B2 7/2013 Choe et al.
9,007,408 B2 4/2015 Jeon et al.
2011/0084955 A1 4/2011 Kim
2018/0226467 A1 8/2018 Ka et al.
2018/0267182 A1* 9/2018 Eguchi .................... G06T 5/002
2019/0107761 A1* 4/2019 Yasuda ............. G02F 1/136213
2020/0258443 A1* 8/2020 Xu ....................... G09G 3/3607

FOREIGN PATENT DOCUMENTS

KR 10-1101070 12/2011
KR 10-1376701 3/2014
KR 10-1605157 3/2016
KR 10-2018-0091994 8/2018
KR 10-1929001 12/2018

* cited by examiner

*Primary Examiner* — Michael A Faragalla
(74) *Attorney, Agent, or Firm* — F. Chau & Associates, LLC

(57) ABSTRACT

A display device including: a display unit including a substrate including a first region and a second region, first pixels are included in the first region, second pixels are included in the second region, first gate lines in the first region are connected to the first pixels, second gate lines in the second region are connected to the second pixels, and data lines are connected to the first and second pixels; and a compensator configured to compensate image data for the first and second pixels, based on correction values, and configured to generate corrected image data by decreasing a brightness of an over-compensated portion of the first and second pixels and increasing a brightness of an under-compensated portion of the first and second pixels in a boundary region between the first region and the second region.

21 Claims, 13 Drawing Sheets

PPA : PPA1, PPA2, PPA3
PXA : PXA1, PXA2, PXA3
PXL : PXL1, PXL2, PXL3
SDV : SDV1, SDV2, SDV3
EDV : EDV1, EDV2, EDV3

PXA2: PXA2_S1, PXA2_S2
PXA3: PXA3_S1, PXA3_S2

DISPLAY DEVICE

CROSS-REFERENCE TO RELATED APPLICATION

The present application claims priority under 35 U.S.C. § 119(a) to Korean patent application no. 10-2019-0029266 filed on Mar. 14, 2019 in the Korean Intellectual Property Office, the disclosure of which is incorporated by reference herein in its entirety.

1. TECHNICAL FIELD

The present invention relates to a display device.

2. RELATED ART

A display device may be a liquid crystal display, an organic light emitting display, or an inorganic light emitting display. The display device may include pixels and lines. For example, each of the pixels may include a light emitting device and transistors connected to the light emitting device to drive the light emitting device.

When the display device includes regions having different sizes and locations, lines disposed in the regions may have different lengths. The lines may have different load values depending on their lengths, and thus, a brightness difference caused by differences between the load values may occur in a final image provided by the display device.

A load matching capacitor is connected to the lines, so that the loads of the lines can be kept equal or similar to each other. However, the area of a dead space of the display device may be increased to provide space for the load matching capacitor.

SUMMARY

In accordance with an exemplary embodiment of the present invention, there is provided a display device including: a display unit including a substrate including a first region and a second region located at a side of the first region, wherein first pixels are included in the first region, second pixels are included in the second region, first gate lines in the first region are connected to the first pixels, second gate lines in the second region are connected to the second pixels, and data lines are connected to the first and second pixels; a gate driver configured to provide a gate signal to the first gate lines and the second gate lines; a compensator configured to compensate image data for the first and second pixels, based on correction values, and configured to generate corrected image data by decreasing a brightness of an over-compensated portion of the first and second pixels and increasing a brightness of an under-compensated portion of the first and second pixels in a boundary region between the first region and the second region; and a data driver configured to generate data signals, based on the corrected image data, and configured to provide the data signals to the data lines, wherein a number of the first pixels connected to each of the first gate lines is greater than a number of the second pixels connected to each of the second gate lines, and wherein the correction values are set for each block, wherein each block corresponds to at least two of the first pixels and at least two of the second pixels.

The compensator may include: a first compensator configured to generate first corrected data by compensating the image data, based on the correction values; and a second compensator configured to compute a brightness curve for the boundary region, based on the first corrected data, and configured to detect and decrease the brightness of the over-compensated portion and detect and increase the brightness of the under-compensated portion, based on the brightness curve.

The second compensator may calculate a first limit value and a second limit value, using a brightness equation for the boundary region and the first corrected data, wherein the brightness curve includes a first inflection point adjacent to the first region and a second inflection point adjacent to the second region, wherein the first limit value is a brightness change value at a point where brightness of the first region converges to the first inflection point, and the second limit value is a brightness change value at a point where brightness of the second region converges to the second inflection point.

When the difference between the first limit value and the second limit value is smaller than a first reference value, the second compensator may set a brightness value in an area between the first inflection point and the second inflection point to be constant, and correct a data value corresponding to the boundary region among the first corrected data, by using the brightness equation and the brightness value.

When the difference between the first limit value and the second limit value exceeds the first reference value, the second compensator may calculate a third limit value and a fourth limit value, by using the brightness equation and the first corrected data, wherein the third limit value is a brightness change value at a point where the brightness of the second region converges to the first inflection point, and the fourth limit value is a brightness change value at a point where the brightness of the first region converges to the second inflection point.

When at least one of a first difference between the first limit value and the third limit value and a second difference between the second limit value and the fourth limit value is larger than a second reference value, the second compensator may set a brightness value in the area between the first inflection point and the second inflection point by interpolating a first brightness value at the first inflection point and a second brightness value at the second inflection point, and correct a data value corresponding to the boundary region among the first corrected data, by using the brightness equation, the first brightness value, and the second brightness value.

The first compensator may generate correction data corresponding to the image data by interpolating the correction values, and generate the first corrected data by adding the image data to the correction data.

The substrate may further include a third region located at the side of the first region, the third region being spaced apart from the second region, wherein the display unit further includes third pixels in the third region and third gate lines in the third region are connected to the third pixels.

The display unit may further include connection lines connecting some of the first gate lines and some of the second gate lines, wherein the connection lines form a parasitic capacitor by being overlapped with a power line.

The compensator may generate corrected image data by decreasing a brightness of an over-compensated area and increasing a brightness of an under-compensated area in a boundary region between a first sub-region in which the first gate lines that are connected to the second gate lines are disposed and a second sub-region in which the first gate lines that are not connected to the second gate lines are disposed.

The display unit may further include connection lines respectively connecting the first gate lines and the second gate lines, wherein the connection lines form a parasitic capacitor by overlapping with a power line.

The substrate may further include a hole, wherein the first region and the second region are located along an edge of the hole.

The display unit may further include connection lines connected to some of the first gate lines, wherein the connection lines are disposed adjacent to the edge of the hole, and form a parasitic capacitor by overlapping with a power line.

The display unit may further include connection lines connected to all of the first gate lines, wherein the connection lines are disposed adjacent to the edge of the hole, and form a parasitic capacitor by overlapping with a power line.

The substrate may further include a third region located at the side of the first region, the third region being spaced apart from the second region, wherein the display unit further includes third pixels in the third region and third gate lines in the third region are connected to the third pixels.

In accordance with an exemplary embodiment of the present invention, there is provided a display device including: a display unit including a substrate including a first region and a second region located at a side of the first region, wherein first pixels are included in the first region, second pixels are included in the second region, first gate lines in the first region are connected to the first pixels, second gate lines in the second region are connected to the second pixels, and data lines are connected to the first and second pixels; a first compensator configured to generate first corrected data by compensating image data, based on correction values; and a second compensator configured to compute a brightness curve for a boundary region between the first region and the second region, based on the first corrected data, and configured to detect and reduce a brightness of a first compensated portion of the first or second pixels and detect and increase a brightness of a second compensated portion of the first or second pixels, based on the brightness curve, wherein a number of the first pixels connected to the first gate lines is greater than a number of the second pixels connected to the second gate lines, wherein the correction values are set for each block corresponding to at least two of the first or second pixels.

The second compensator may calculate a first limit value and a second limit value, based on a brightness equation for the boundary region and the first corrected data, wherein the brightness curve includes a first inflection point adjacent to the first region and a second inflection point adjacent to the second region, wherein the first limit value is a brightness change value at a point where brightness of the first region converges to the first inflection point, and the second limit value is a brightness change value at a point where brightness of the second region converges to the second inflection point.

When the difference between the first limit value and the second limit value is smaller than a first reference value, the second compensator may set a brightness value in an area between the first inflection point and the second inflection point to be constant, and correct a data value corresponding to the boundary region among the first corrected data, by using the brightness equation and the brightness value.

When the difference between the first limit value and the second limit value exceeds the first reference value, the second compensator may calculate a third limit value and a fourth limit value, by using the brightness equation and the first corrected data, wherein the third limit value is a brightness change value at a point wherein the brightness of the second region converges to the first inflection point, and the fourth limit value is a brightness change value at a point where the brightness of the first region converges to the second inflection point.

When at least one of a first difference between the first limit value and the third limit value and a second difference between the second limit value and the fourth limit value is larger than a second reference value, the second compensator may set a brightness value in the area between the first inflection point and the second inflection point by interpolating a first brightness value at the first inflection point and a second brightness value at the second inflection point, and correct a data value corresponding to the boundary region among the first corrected data, by using the brightness equation, the first brightness value, and the second brightness value.

In accordance with an exemplary embodiment of the present invention, there is provided a display device including: a substrate including a first region and a second region adjacent to the first region, wherein first pixels are included in the first region, and second pixels are included in the second region; and a compensator configured to receive image data, generate first corrected data by using correction values, and generate second corrected data by using the first corrected data and a brightness equation, wherein when generating the second corrected data, the compensator decreases a luminance of a first portion of the second pixels disposed adjacent to the first region and increases a luminance of a second portion of the second pixels disposed adjacent to the first region.

BRIEF DESCRIPTION OF THE DRAWINGS

The above and other features of the present invention will become more apparent by describing in detail exemplary embodiments thereof with reference to the accompanying drawings.

FIGS. 13A, 133 and 13C are plan views illustrating other examples of the opening region included in the display device shown in FIG. 11.

DETAILED DESCRIPTION OF THE EMBODIMENTS

Figure 1:
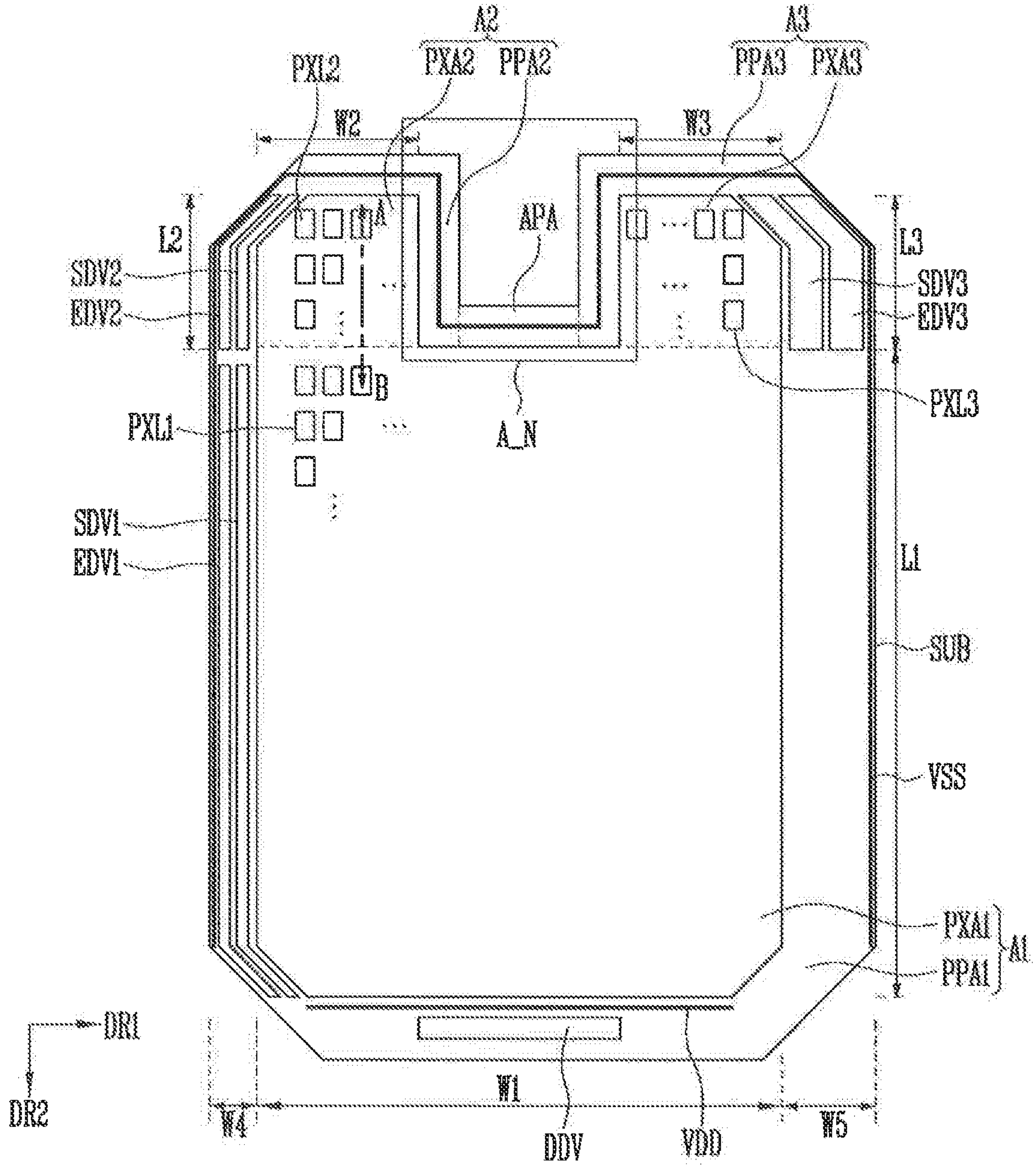
FIG. 1 is a plan view illustrating a display device in accordance with an exemplary embodiment of the present invention.

Hereinafter, exemplary embodiments of the present invention will be described in more detail with reference to the accompanying drawings. The present invention may, however, be embodied in different forms and should not be construed as limited to the embodiments set forth herein.

Throughout the attached drawings, the same reference numerals may be given to the same elements, and their overlapping descriptions may be omitted. Dimensional relationships among individual elements in the attached drawings may be exaggerated for ease of understanding and are not to be limited to the actual scale shown. It should also be noted that when an element is referred to as being "between" two elements, it can be the only element between the two elements, or one or more intervening elements may also be present.

FIG. 1 is a plan view illustrating a display device in accordance with an exemplary embodiment of the present invention.

Referring to FIG. 1, the display device may include a substrate SUB, pixels PXL1, PXL2, and PXL3 (hereinafter, referred to as PXL), a driver provided on the substrate SUB to drive the pixels PXL, and a line part connecting the pixels PXL and the driver. In addition, the display device may further include a power supply configured to supply a power source to the pixels PXL.

The substrate SUB may include regions A1, A2, and A3, and at least two of the regions A1, A2, and A3 may have different areas. The regions A1, A2, and A3 may be divided by dispositions, lengths, etc, of corresponding lines.

Although a case where the substrate SUB includes first, second and third regions A1, A2, and A3 is illustrated in FIG. 1, this is merely illustrative, and the substrate SUB is not limited thereto. For example, the substrate SUB may have two regions or four or more regions, and at least two of the regions may have different areas.

Each of the first to third regions A1, A2, and A3 may have various shapes. For example, each of the first to third regions A1, A2, and A3 may be provided in various shapes such as a dosed polygon including linear sides, a circle, an ellipse, etc., including curved sides, and a semicircle, a semi-ellipse, etc., including linear and curved sides.

In an exemplary embodiment of the present invention, each of the first to third regions A1, A2, and A3 may have an approximately quadrangular shape, and have a shape in which a region adjacent to at least one vertex among vertices of the quadrangular shape is removed. The removed region adjacent to at least one vertex among the vertices of the quadrangular shape may have a triangular shape, or have a quadrangular shape, an oblique line shape inclined with respect to one side of a quadrangular shape, a bent segment shape, or a rounded corner shape.

The first to third regions A1, A2, and A3 may have pixel regions PXA1, PXA2, and PXA3 (hereinafter, referred to as PXA) (or display regions) and peripheral regions PPA1, PPA2, and PPA3 (hereinafter, referred to as PPA) (or non-display regions), respectively.

The pixel regions PXA are regions in which pixels PXL for displaying an image are provided. The pixels PXL will be described later with reference to FIG. 4. First, second and third pixel regions PXA1, PXA2, and PXA3 may roughly have shapes corresponding to the first to third regions A1, A2, and A3, respectively.

The peripheral regions PPA are regions in which the pixels PXL are not provided, and are regions in which the image is not displayed. The driver, the power supply, and some of lines may be provided in the peripheral regions PPA. The peripheral regions PPA may correspond to a bezel (or dead space) of the final display device, and a width of the bezel may be determined based on widths of the peripheral regions PPA.

The first region A1 may have the largest area among the first to third regions A1, A2, and A3. The first region A1 may have the first pixel region PXA1 in which an image is displayed and a first peripheral region PPA1 surrounding at least a portion of the first pixel region PXA1.

The first pixel region PXA1 may have a shape corresponding to that of the first region A1. The first pixel region PXA1 may have a first width W1 in a first direction DR1, and have a first length L1 in a second direction DR2 intersecting the first direction DR1.

The first peripheral region PPA1 may be provided near at least one side of the first pixel region PXA1. For example, the first peripheral region PPA1 surrounds an edge of the first pixel region PXA1, and except for where the second region A2 and the third region A3 are located. The first peripheral region PPA1 may include a lateral part extending in the width direction thereof and a longitudinal part extending in the length direction thereof. The longitudinal part of the first peripheral region PPA1 may be provided in a pair spaced apart from each other along the width direction of the first pixel region PXA1 (or the first direction DR1). For example, the longitudinal part of the first peripheral region PPA1 may be disposed on opposite sides of the first pixel region PXA1.

The second region A2 may have an area smaller than that of the first region A1. The second region A2 may include the second pixel region PXA2 in which an image is displayed and a second peripheral region PPA2 surrounding at least a portion of the second pixel region PXA2.

The second pixel region PXA2 may have a shape corresponding to that of the second region A2. The second pixel region PXA2 may have a second width W2 smaller than the first width W1 of the first region A1. The second pixel region PXA2 may have a second length L2 smaller than the first length L1 of the first region A1. The second pixel region PXA2 may protrude from the first pixel region PXA1, and be connected directly to the first pixel region PXA1. In other words, in the second pixel region PXA2, an edge portion closest to the first pixel region PXA1 may correspond to the edge of the first pixel region PXA1.

The second peripheral region PPA2 may be provided near at least one side of the second pixel region PXA2. The second peripheral region PPA2 surrounds the second pixel region PXA2, except for a portion where the first pixel region PXA1 and the second pixel region PXA2 are connected to each other. The second peripheral region PPA2 may also include a lateral part extending in the first direction DR1 and a longitudinal part extending in the second direction DR2. The longitudinal part of the second peripheral region PPA2 may be provided in a pair spaced apart from each other along the first direction DR1. For example, the longitudinal part of the second peripheral region PPA2 may be disposed on opposite sides of the second pixel region PXA2.

The third region A3 may have an area smaller than that of the first region A1. The third region A3 may have the third pixel region PXA3 in which an image is displayed and a third peripheral region PPA3 surrounding at least a portion of the third pixel region PXA3.

The third pixel region PXA3 may have a shape corresponding to that of the third region A3. The third pixel region PXA3 may have a width W3 smaller than the first width W1 of the first region A1. The third pixel region PXA3 may have a third length L3 smaller than the first length L1 of the first region A1. The second width W2 and the third width W3 may be equal to each other. In the alternative, the second width W2 and the third width W3 may be different from each other. In addition, the second length L2 and the third length L3 may be equal to each other. In the alternative, the second length L2 and the third length L3 may be different from each other.

The third pixel region PXA3 may protrude from the first pixel region PXA1, and be connected directly to the first pixel region PXA1. In other words, in the third pixel region PXA3, an edge portion closest to the first pixel region PXA1 may correspond to the edge of the first pixel region PXA1.

The third peripheral region PPA3 may be provided near at least one side of the third pixel region PXA3. The third peripheral region PPA3 surrounds the third pixel region PXA3, except for a portion where the first pixel region PXA1 and the third pixel region PXA3 are connected to each other. The third peripheral region PPA3 may also include a lateral part extending in the width direction thereof and a longitudinal part extending in the length direction thereof. The longitudinal part of the third peripheral region PPA3 may be provided in a pair spaced apart from each other along the width direction of the first pixel region PXA1. For example, the longitudinal part of the third peripheral region PPA3 may be disposed on opposite sides of the third pixel region PXA3.

In an exemplary embodiment of the inventive concept, the third region A3 may have a shape that is line-symmetric to the second region A2 with respect to a center line of the first region A1. The arrangement of components provided in the third region A3 may be substantially identical to that in the second region A2 except for some lines.

Therefore, the substrate SUB may have a shape in which the second region A2 and the third region A3 protrude in the second direction D2 from the first region A1. In other words, the second region A2 and the first region A1 protrude away from the first region A1. In addition, the second region A2 and the third region A3 are spaced apart from each other with respect to the first region A1. In this case, the substrate SUB may have an opening between the second region A2 and the third region A3. In other words, the substrate SUB may have a notch between the second region A2 and the third region A3.

In an exemplary embodiment of the present invention, the longitudinal parts of the first peripheral region PPA1 may be respectively connected to some of the longitudinal parts of the second peripheral region PPA2 and the third peripheral region PPA3. For example, a left longitudinal part of the first peripheral region PPA1 may be connected to a left longitudinal part of the second peripheral region PPA2. A right longitudinal part of the first peripheral region PPA1 may be connected to a right longitudinal part of the third peripheral region PPA3. In addition, the left longitudinal part of the first peripheral region PPA1 and the left longitudinal part of the second peripheral region PPA2 may have the same width W4. The right longitudinal part of the first peripheral region PPA1 and the right longitudinal part of the third peripheral region PPA3 may have the same width W5.

The width W4 (or fourth width) of the left longitudinal parts of the first peripheral region PPA1 and the second peripheral region PPA2 may be different from the width W5 (or fifth width) of the right longitudinal parts of the first peripheral region PPA1 and the third peripheral region PPA3. For example, the width W4 of the left longitudinal parts of the first peripheral region PPA1 and the second peripheral region PPA2 may be smaller than the width W5 of the right longitudinal parts of the first peripheral region PPA1 and the third peripheral region PPA3.

In an exemplary embodiment of the inventive concept, the second peripheral region PPA2 and the third peripheral region PPA3 may be connected to each other through an additional peripheral region APA. For example, the additional peripheral region APA may connect the right longitudinal part of the second peripheral region PPA2 and the left longitudinal part of the third peripheral region PPA3. In other words, the additional peripheral region ARA may be provided at a side of the first pixel region PXA1 between the second region A2 and the third region A3. For example, the additional peripheral region APA may be provided in the notch.

The pixels PXL may be provided in the pixel regions PXA, e.g., the first to third pixel regions PXA1, PXA2, and PXA3 on the substrate SUB. Each of the pixels PXL may be a minimum unit for displaying an image, and be provided in plurality in each of the first to third pixel regions PXA1, PXA2, and PXA3. The pixels PXL may include a display element (or light emitting device) that emits light. For example, the display element may be a liquid crystal display element, an organic light emitting display element, or an inorganic light emitting display element. Hereinafter, for convenience of description, a case where the display element is an organic light emitting display element will be assumed.

Each of the pixels PXL may emit light of one of red, green, and blue, but the present invention is not limited thereto. For example, each of the pixels PXL may emit light of a color such as cyan, magenta, yellow, or white.

The pixels PXL may include first pixels PXL1 arranged in the first pixel region PXA1, second pixels PXL2 arranged in the second pixel region PXA2, and third pixels PXL3 arranged in the third pixel region PXA3. In an exemplary embodiment of the inventive concept, each of the first to third pixels PXL1, PXL2, and PXL3 may be arranged in a matrix form along rows extending in the first direction DR1 and columns extending in the second direction DR2. However, the arrangement of the first to third pixels PXL1, PXL2, and PXL3 is not limited thereto. For example, the first to third pixels PXL1, PXL2, and PXL3 may be arranged in various forms. For example, the first pixels PXL1 may be arranged such that the first direction DR1 is the row direction, and the second pixels PXL2 may be arranged such that a direction different from the first direction DR1, e.g., a direction oblique to the first direction DR1 is the row direction. In addition, the third pixels PXL3 may be arranged in a direction identical to or different from that of the first pixels PXL1 and/or the second pixels PXL2. For example, the row direction may be the second direction DR2, and the column direction may be the first direction DR1.

In an exemplary embodiment of the present invention, in the second region A2 and the third region A3, numbers of second pixels PXL2 and third pixels PXL3 may vary depending on rows. In addition, in the second region A2 and the third region A3, lengths of lines may vary depending on columns. This will be described later with reference to FIG. 2.

The driver provides a signal to each pixel PXL through the line part, and accordingly, driving of the pixel PXL can be controlled. The line part will be described later with reference to FIG. 3.

The driver may include scan drivers SDV1, SDV2, and SDV3 (hereinafter, referred to as SDV) configured to provide a scan signal to each pixel PXL along a scan line, emission drivers EDV1, EDV2, and EDV3 (hereinafter, referred to as EDV) configured to provide an emission control signal to each pixel PXL along an emission control line, a data driver DDV configured to provide a data signal to each PXL along a data line, and a timing controller. The timing controller may control the scan drivers SDV, the emission drivers EDV, and the data driver DDV.

In an exemplary embodiment of the present invention, the scan drivers SDV may include a first scan driver SDV1 connected to the first pixels PXL1, a second scan driver SDV2 connected to the second pixels PXL2, and a third scan driver SDV3 connected to the third pixels PXL3. The emission drivers EDV may include a first emission driver EDV1 connected to the first pixels PXL1, a second emission driver EDV2 connected to the second pixels PXL2, and a third emission driver EDV3 connected to the third pixels PXL3.

The first scan driver SDV1 may be disposed at the longitudinal part of the first peripheral region PPA1. Since the peripheral part of the first peripheral region PPA1 is provided in a pair spaced apart from each other along the width direction of the first pixel region PXA1, the first scan driver SDV1 may be disposed near at least one side of the longitudinal part of the first peripheral region PPA1. For example, the first scan driver SDV1 may be disposed at the left side of the first peripheral region PPA1. The first scan driver SDV1 may extend along the length direction of the first peripheral region PPA1.

The second scan driver SDV2 may be disposed in the second peripheral region PPA2, and the third scan driver SDV3 may be disposed in the third peripheral region PPA3.

In an exemplary embodiment of the present invention, the scan drivers SDV may be directly mounted on the substrate SUB. When the scan drivers SDV are directly mounted on the substrate SUB, the scan drivers SDV may be formed together with the pixels PXL in a process of forming the pixels PXL. However, the mounting position and forming method of the scan drivers SDV are not limited thereto. For example, the scan drivers SDV may be formed in a separate chip to be provided in the form of chip on glass on the substrate SUB. Alternatively, the scan drivers SDV may be mounted on a printed circuit board to be connected to the substrate SUB through a connection member.

Like the first scan driver SDV1, the first emission driver EDV1 may also be disposed at the longitudinal part of the first peripheral region PPA1. The first emission driver EDV1 may be disposed near at least one side of the longitudinal part of the first peripheral region PPA1. The first emission driver EDV1 may extend along the length direction of the first peripheral region PPA1.

The second emission driver EDV2 may be disposed in the second peripheral region PPA2, and the third emission driver EDV3 may be disposed in the third peripheral region PPA3.

In an exemplary embodiment of the present invention, the emission drivers EDV may be directly mounted on the substrate SUB. When the emission drivers EDV are directly mounted on the substrate SUB, the emission drivers EDV may be formed together with the pixels PXL in the process of forming the pixels PXL. However, the mounting position and forming method of the emission drivers EDV are not limited thereto. For example, the emission drivers EDV may be formed in a separate chip to be provided in the form of chip on glass on the substrate SUB. Alternatively, the emission drivers EDV may be mounted on a printed circuit board to be connected to the substrate SUB through a connection member.

In the present embodiment, although a case where the scan drivers SDV and the emission drivers EDV are adjacent to each other and are formed at only one side of the pair of longitudinal parts of the peripheral regions PPA is illustrated as an example, the present invention is not limited thereto. The arrangement of the scan drivers SDV and the emission drivers EDV may be changed in various manners. For example, the first scan driver SDV1 may be provided at one side of the longitudinal part of the first peripheral region PPA1, and the first emission driver EDV1 may be provided at the other side of the longitudinal part of the first peripheral region PPA1. Alternatively, the first scan driver SDV1 may be provided at both sides of the longitudinal part of the first peripheral region PPA1, and the first emission driver EDV1 may be provided at only one side of the longitudinal part of the first peripheral region PPA1.

The data driver DDV may be disposed in the first peripheral region PPA1. The data driver DDV may be disposed at the lateral part of the first peripheral region PPM. The data driver DDV may extend along the width direction of the first peripheral region PPA1.

In an exemplary embodiment of the present invention, the positions of the scan drivers SDV, the emission drivers EDV, and/or the data driver DDV may be changed.

The timing controller may be connected, in various manners, to the first to third scan drivers SDV1, SDV2, and SDV3, the first to third emission drivers EDV1, EDV2, and EDV3, and the data driver DDV through lines. The position at which the timing controller is disposed is not particularly limited. For example, the timing controller may be mounted on a printed circuit board to be connected to the first to third scan drivers SDV1, SDV2, and SDV3, the first to third emission drivers EDV1, EDV2, and EDV3, and the data driver DDV through a flexible printed circuit board. The printed circuit board may be disposed at various positions such as a front side of the substrate SUB and a back side of the substrate SUB.

In addition, one of the second and third scan drivers SDV2 and SDV3 and one of the second and third emission drivers EDV2 and EDV3 may be omitted in a configuration in which scan lines or emission control lines of the second pixels PXL2 and the third pixels PXL3 which correspond to the same row, are electrically connected through a scan line connection part or an emission control line connection part.

The power supply may include at least one power supply line VDD and VSS. For example, the power supply may include a first power supply line VDD and a second power supply line VSS. The first power supply line VDD and the second power supply line VSS may supply power to the first pixel PXL1, the second pixel PXL2, and the third pixel PXL3.

One of the first power supply line VDD and the second power supply line VSS, e.g., the first power supply line VDD, may be disposed at one side of the first peripheral region PPA1. For example, the first power supply line VDD may be disposed in a region in which the data driver DDV of the first peripheral region PPA1 is disposed. In addition, the first power supply line VDD may extend in the width direction of the first pixel region PXA1.

The other of the first power supply line VDD and the second power supply line VSS, e.g., the second power supply line VSS, may surround the first pixel region PXA1, the second pixel region PXA2, and the third pixel region PXA3, except for the region in which the data driver DDV of the first peripheral region PPA1 is disposed. For example, the second power supply line VSS may extend along the left longitudinal part of the first peripheral region PPA1, the second peripheral region PPA2, the additional peripheral region APA, the third peripheral region PPA3, and the right longitudinal part of the first peripheral region PPA1.

Although a case where the first power supply line VDD is disposed at one side of the first pixel region PXA1 in the first peripheral region PPA1 and the second power supply line VSS is disposed in the other peripheral regions is described as an example, the present invention is not limited thereto. For example, the first power supply line VDD and the second power supply line VSS may surround the first pixel region PXA1, the second pixel region PXA2, and the third pixel region PXA3.

A voltage applied to the first power supply line VDD may be higher than that applied to the second power supply line VSS.

Accordingly, the load of a line (e.g., a scan line) connected to second pixels PXL2 in the second region A2 (and/or third pixels PXL3 in the third region A3) may be different from that of a line connected to first pixels PXL1 in the first region A1. Thus, the brightness of an image displayed in the second region A2 may be different from that of an image displayed in the first region A1. In other words, when brightness of the display device is measured along line A-B shown in FIG. 1, a rapid change in brightness may occur between the first region A1 and the second region A2. Such a rapid change in brightness and a configuration of compensating therefor will be described later with reference to FIGS. 8 to 10, after a configuration of the display device is described.

Figure 2:
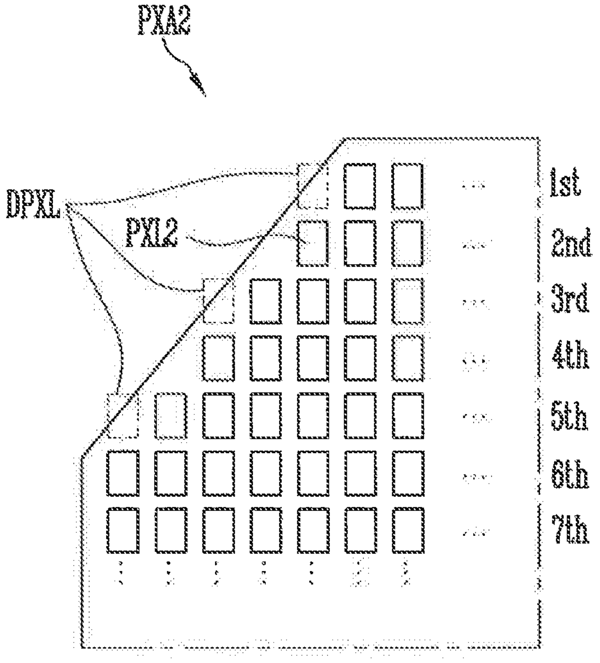
FIG. 2 is a plan view illustrating an example of a second pixel region included in the display device shown in FIG. 1.

FIG. 2 is a plan view illustrating an example of the second pixel region included in the display device shown in FIG. 1.

Referring to FIG. 2, in the second pixel region PXA2, the number of second pixels PXL2 may vary depending on rows. For example, in the second pixel region PXA2, a number of second pixels PXL2 disposed in a row corresponding to a corner having an oblique side may be smaller than that of second pixels PXL2 disposed in a row corresponding to a corner including a linear side. For example, the number of second pixels PXL2 in a $2^{nd}$ row at the oblique side may be less than the number of second pixels PXL2 in a $7^{th}$ row at the linear side. In addition, the number of second pixels PXL2 disposed in a row may decrease as the length of the row is shortened. Therefore, the length of a line connecting second pixels PXL2 may be shortened.

In exemplary embodiments of the present invention, the second pixels PXL2 may include dummy pixels DPXL. The dummy pixels DPXL may be pixels that are disposed at an edge of the second pixel region PXA2 and do not display any image, among the second pixels PXL2.

In an exemplary embodiment of the present invention, some of the rows in the second pixel region PXA2 may include the same number of second pixels PXL2. For example, the number of pixels included in a first row may be equal to that of pixels included in a second row. The length and load of a first line (e.g., a first scan line) connected to the pixels of the first row may be substantially equal or similar to those of a second line (e.g., a second scan line) connected to the pixels of the second row. Additionally, a third pixel row and a fourth pixel row may include the same number of pixels, and fifth, sixth and seventh pixel rows may include the same number of pixels. Accordingly, in the second pixel region PXA2, loads of lines in the respective rows can be similarly controlled. However, the area of a dead space may be increased depending on the arrangement of dummy pixels DPXL.

Figure 3:
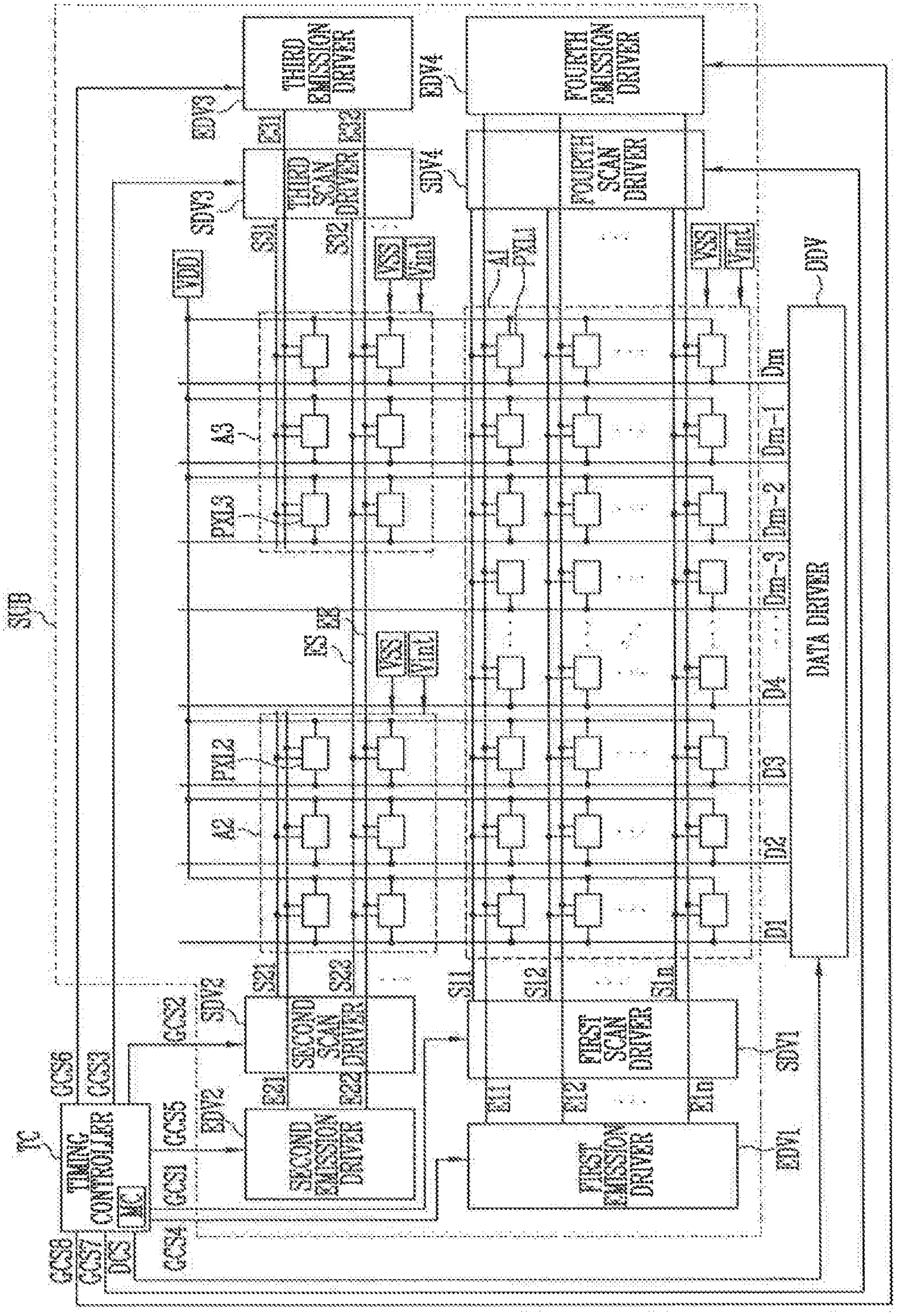
FIG. 3 is a block diagram illustrating an example of the display device shown in FIG. 1.

FIG. 3 is a block diagram illustrating an example of the display device shown in FIG. 1.

Referring to FIG. 3, the display device includes a display unit, a driver, and a line part.

The display unit may include pixels PXL, and the pixels PXL may include first to third pixels PXL1, PXL2, and PXL3. The driver may include first to third scan drivers SDV1, SDV2, and SDV3, first to third emission drivers EDV1, EDV2, and EDV3, a data driver DDV, and a timing controller TC. In addition, the driver may further include a fourth scan driver SDV4 and a fourth emission driver EDV4.

Positions of the first to third scan drivers SDV1, SDV2, and SDV3, the first to third emission drivers EDV1, EDV2, and EDV3, the data driver DDV, and the timing controller TC are shown for convenience of description, and may be variously changed. For example, although the data driver DDV is disposed closer to a first region A1 than a second region A2 and a third region A3, the data driver DDV may be disposed adjacent to the second region A2 and the third region A3.

The line part provides a signal of the driver to each pixel PXL, and includes gate lines (e.g., scan lines and emission control lines), data lines, a power line, and an initialization power line (not shown). In addition, the line part may further include a first load matching capacitor.

The gate lines may be connected to transistors (or gate electrodes of the transistors) provided in the first to third pixels PXL1, PXL2, and PXL3, and the transistors may be turned on in response to a gate signal (e.g., a scan signal or an emission control signal) having a turn-on voltage level, which is transmitted through the gate lines.

The gate lines may include the scan lines and the emission control lines.

The scan lines may include first to third scan lines S11 to S1*n*, S21, S22, S31, and S32 respectively connected to the first to third pixels PXL1, PXL2, and PXL3, and the emission control lines may include first to third emission control lines E11 to E1*n*, E21, E22, E31, and E32 respectively connected to the first to third pixels PXL1, PXL2, and PXL3. The data lines D1 to Dm and the power line may be connected to the first to third pixels PXL1, PXL2, and PXL3.

In exemplary embodiments of the present invention, at least some of the second scan lines S21 and S22 and at least some of the third scan lines S31 and S32 may be electrically connected to each other by scan line connection parts ES (or scan line connection lines). For example, a second scan line S22 may be electrically connected to a second third scan line S32 by the scan line connection part ES. Although a case where a first second scan line S21 is electrically separated from a first third scan line S31 is illustrated in FIG. 1, the present invention is not limited thereto.

In addition, at least some of the second emission control lines E21 and E22 and at least some of the third emission control lines E31 and E32 may be electrically connected to each other by emission control line connection parts EE (or emission control line connection lines). For example, a second second emission control line E22 is electrically connected to second third emission control line E32 by the emission control line connection part EE. Although a case where a first second emission control line E21 is electrically separated from a first third emission control line E31 is illustrated in FIG. 3, the present invention is not limited thereto.

The first pixels PXL1 may be located in the first region A1. The first pixels PXL1 may be connected to the first scan lines S11 to S1*n*, the first emission lines E11 to E1*n*, and the data lines D1 to Dm. Each first pixel PXL1 may receive a data signal from a corresponding data line among the data lines D1 to Dm when a scan signal is supplied from a corresponding first scan line among the first scan lines S11 to S1*n*. The first pixel PXL1 may control an amount of current flowing from a first power supply line VDD to a second power supply line VSS via a light emitting device included therein.

The second pixels PXL2 may be located in the second region A2. The second pixels PXL2 may be connected to the second scan lines S21 and S22, the second emission control lines E21 and E22, and the data lines D1 to D3. Each second pixel PXL2 may receive a data signal from a corresponding data line among the data lines D1 to D3 when a scan signal is supplied from a corresponding second scan line among the second scan lines S21 and S22. In addition, each of at least some of the second pixels PXL2 may receive a data signal from a corresponding data line among the data lines D1 to D3 when a scan signal is supplied from a corresponding third scan line among the third scan lines S31 and S32.

Although a case where six second pixels PXL2 are located in the second region A2 connected by two second scan lines S21 and S22, two second emission control lines E21 and E22, and three data lines D1 to D3 is illustrated in FIG. 3, the present invention is not limited thereto. In other words, a plurality of second pixels PXL2 are arranged depending on the size of the second region A2, and numbers of second scan lines, second emission control lines, and data lines may be variously set depending on the number of second pixels PXL2. For example, about 90 second scan lines may be arranged in the second region A2.

The third pixels PXL3 may be located in the third region A3. The third pixels PXL3 may be connected to the third scan lines S31 and S32, the third emission control lines E31 and E32, and the data lines Dm−2 to Dm. Each third pixel PXL3 may receive a data signal from a corresponding data line among the data lines Dm−2 to Dm when a scan signal is supplied from a corresponding third scan line among the third scan lines S31 and S32. In addition, each of at least some of the third pixels PXL3 may receive a data signal from a corresponding data line among the data lines Dm−2 to Dm when a scan signal is supplied from a corresponding scan line among the third scan lines S31 and S32 and the second scan lines S21 and S22.

The first scan driver SDV1 may supply a scan signal to the first scan lines S11 to S1*n* in response to a first gate control signal GCS1 from the timing controller TC. For example, the first scan driver SDV1 may sequentially supply the scan signal to the first scan lines S11 to S1*n*. When the scan signal is sequentially supplied to the first scan lines S11 to S1*n*, the first pixels PXL1 may be sequentially selected in units of horizontal lines (or in units of rows).

The second scan driver SDV2 may supply a scan signal to the second scan lines S21 and S22 in response to a second gate control signal GCS2 from the timing controller TC. At least some of the scan signals supplied to the second scan lines S21 and S22 may be supplied to at least some of the third scan lines S31 and S32 through the scan line connection part ES. The second scan driver SDV2 may sequentially supply the scan signal to the second scan lines S21 and S22. When the scan signal is sequentially supplied to the second scan lines S21 and S22, the second pixels PXL2 and the third pixels PXL3 may be sequentially selected in units of horizontal lines.

The third scan driver SDV3 may supply a scan signal to the third scan lines S31 and S32 in response to a third gate control signal GCS3 from the timing controller TC. At least some of the scan signals supplied to the third scan lines S31 and S32 may be supplied to at least some of the second scan lines S21 and S22 through the scan line connection part ES. The third scan driver SDV3 may sequentially supply the scan signal to the third scan lines S31 and S32. When the scan signal is sequentially supplied to the third scan lines S31 and S32, the second pixels PXL2 and the third pixels PXL3 may be sequentially selected in units of horizontal lines.

Since at least some of the second scan lines S21 and S22 and at least some of the third scan lines S31 and S32 are electrically connected to each other by the scan line connection part ES, the scan signal supplied from the second scan driver SDV2 and the scan signal supplied from the third scan driver SDV3 may be supplied to be synchronized with each other.

For example, a scan signal supplied to a first second scan line S21 from the second scan driver SDV2 may be simultaneously supplied with a scan signal supplied to a first third scan line S31 from the third scan driver SDV3. Similarly, a scan signal supplied to a second second scan line S22 from the second scan driver SDV2 may be simultaneously supplied with a scan signal supplied to a second third scan line S32 from the third scan driver SDV3.

When a scan signal is supplied to the second scan lines S21 and S22 and the third scan lines S31 and S32 by using the second scan driver SDV2 and the third scan driver SDV3, a delay of the scan signal due to an RC delay of the second scan lines S21 and S22 and the third scan lines S31 and S32 can be prevented. Therefore, a desired scan signal can be supplied to the second scan lines S21 and S22 and the third scan lines S31 and S32.

Additionally, the second scan driver SDV2 and the third scan driver SDV3 are driven to be synchronized with each other, and accordingly can be driven by the same gate control signal GCS. For example, the third gate control signal GCS3 supplied to the third scan driver SDV3 may be the same signal as the second gate control signal GCS2.

The fourth scan driver SDV4 may supply a scan signal to the first scan lines S11 to S1*n* in response to a seventh gate control signal GCS7. For example, the fourth scan driver SDV4 may sequentially supply the scan signal to the first scan lines S11 to S1*n*.

The fourth scan driver SDV4 may supply the scan signal to the first scan lines S11 to S1*n* to be synchronized with the first scan driver SDV1. For example, a first first scan line S11 among the first scan lines S11 to S1*n* may simultaneously receive a scan signal from the first scan driver SDV1 and the fourth scan driver SD4. Thus, a delay of the scan signal due to an RC delay of the first scan lines S11 to S1*n* can be prevented.

The first scan driver SDV1 and the fourth scan driver SDV4 are driven to be synchronized with each other, and accordingly can be driven by the same gate control signal GCS. For example, the seventh gate control signal GCS7 supplied from the fourth scan driver SDV4 may be the same signal as the first gate control signal GCS1.

The first emission driver EDV1 may supply an emission control signal to the first emission control lines E11 to E1*n* in response to a fourth gate control signal GCS4. For example, the first emission driver EDV1 may sequentially supply the emission control signal to the first emission control lines E11 to E1*n*.

The second emission driver EDV2 may supply an emission control signal to the second emission control lines E21 and E22 in response to a fifth gate control signal GCS5. At least some of the emission control signals supplied to the second emission control lines E21 and E22 may be supplied to at least some of the third emission control lines E31 and E32 through the emission control line connection part EE. The second emission driver EDV2 may sequentially supply the emission control signal to the second emission control lines E21 and E22.

The third emission driver EDV3 may supply an emission control signal to the third emission control lines E31 and E32 in response to a sixth gate control signal GCS6. At least some of the emission control signals supplied to the third emission control lines E31 and E32 may be supplied to at least some of the second emission control lines E21 and E22 through the emission control line connection part EE. The third emission driver EDV3 may sequentially supply the emission control signal to the third emission control lines E31 and E32.

The emission control signal may be set to a gate-off voltage (e.g., a high voltage) such that transistors included in the pixels PXL can be turned off, and the scan signal may be set to a gate-on voltage (e.g., a low voltage) such that the transistors included in the pixels PXL can be turned on.

Since at least some of the second emission control lines E21 and E22 and at least some of the third emission control lines E31 and E32 are electrically connected to each other by the emission control line connection part EE, the emission control signal supplied from the second emission driver EDV2 and the emission control signal supplied from the third emission driver EDV3 may be supplied to be synchronized with each other.

For example, an emission control signal supplied to a first second emission control line E21 from the second emission driver EDV2 may be simultaneously supplied with an emission control signal supplied to a first third emission control line E31 from the third emission driver EDV3. Thus, a delay of the emission control signal due to an RC delay of the second emission control lines E21 and E22 and the third emission control lines E31 and E32 can be prevented.

Additionally, the second emission driver EDV2 and the third emission driver EDV3 are driven to be synchronized with each other, and accordingly can be driven the same gate control signal GCS. For example, the sixth gate control signal GCS6 supplied to the third emission driver EDV3 may be the same signal as the fifth gate control signal GCS5 supplied to the second emission driver EDV2.

The fourth emission driver EDV4 may supply an emission control signal to the first emission control lines E11 to E1N in response to an eighth gate control signal GCS8 from the timing controller TC. For example, the fourth emission driver EDV4 may sequentially supply the emission control signal to the first emission control lines E11 to E1*n*.

The fourth emission driver EDV4 may supply an emission control signal to the first emission control lines E11 to E1*n* to be synchronized with the first emission driver EDV1. Thus, a delay of the emission control signal due to an RC delay of the first emission control lines E11 to E1N can be prevented, and accordingly, a desired emission control signal can be supplied to the first emission control lines E11 to E1*n*.

The first emission driver EDV1 and the fourth emission driver EDV4 are driven to be synchronized with each other, and accordingly can be driven by the same gate control signal GCS. For example, the eighth gate control signal GCS8 supplied from the fourth emission driver EDV4 may be the same signal as the fourth gate control signal GCS4 supplied from the first emission driver EDV1.

The data driver DDV may supply a data signal to the data lines D1 to Dm in response to a data control signal DCS. The data signal supplied to the data lines D1 to Dm may be supplied to pixels PXL selected by the scan signal.

The timing controller TC may supply, to the scan drivers SDV and the emission drivers EDV, the first to eighth gate control signals GCS1 to GCS8 generated based on timing signals supplied from the outside. In addition, the timing controller TC may supply the data control signal DCS to the data driver DDV.

Each of the first to eighth gate control signals GCS1 to GCS8 may include a start pulse and clock signals. The start pulse may be used to control a timing of a first scan signal or a first emission control signal. The clock signals may be used to shift the start pulse.

The data control signal DCS may include a source start pulse and dock signals. The source start pulse may be used to control a sampling start time of data. The clock signals may be used to control a sampling operation.

When the display device is sequentially driven, the first scan driver SDV1 may receive the last output signal of the second scan driver SDV2 as a start pulse, and the fourth scan driver SDV4 may receive the last output signal of the third scan driver SDV3 as a start pulse. Similarly, when the display device is sequentially driven, the first emission driver EDV1 may receive the last output signal of the second emission driver EDV2 as a start pulse, and the fourth emission driver SDV4 may receive the last output signal of the third emission driver SDV3 as a start pulse.

In exemplary embodiments of the present invention, the timing controller TC may include a compensator MC. The compensator MC compensates image data (e.g., input image data provided from the outside) by using a block-based Mura compensation technique. For example, the compensator MC may generate corrected image data by cutting off an excessively compensated portion of which brightness is excessively compensated (e.g., the brightness of the excessively compensation portion may be reduced) and an insufficiently compensated portion of which brightness is not sufficiently compensated (e.g., the brightness of the insufficiently compensated portion may be increased) between the first and second pixel regions PXA1, and PXA2 (as well as between the first to third regions PXA1, PXA2, and PXA3). Therefore, the data driver DDV may generate a data signal, based on the corrected image data.

A detailed configuration of the compensator MC will be described later with reference to FIG. 9.

Figure 4:
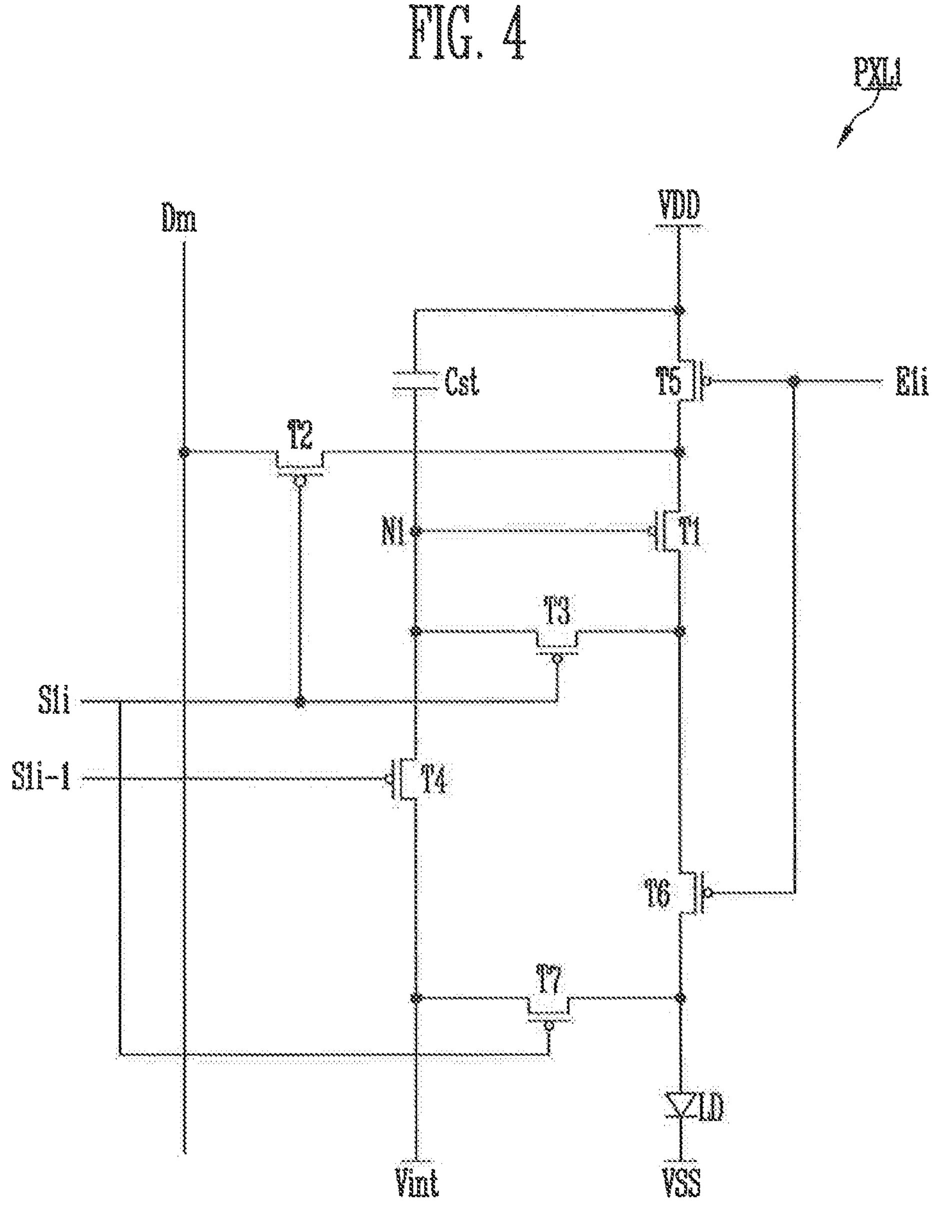
FIG. 4 is a circuit diagram illustrating an example of a pixel included in the display device shown in FIG. 3.

FIG. 4 is a circuit diagram illustrating an example of the pixel included in the display device shown in FIG. 3. The first to third pixels PXL1, PXL2, and PXL3 included in the display device shown in FIG. 3 may have circuit structures substantially identical or similar to one another, except for positions at which the first to third pixels PXL1, PXL2, and PXL3 are disposed. Therefore, the first pixel PXL1 will be described in FIG. 4; however, this description is applicable to the second and third pixels PXL2 and PXL3.

Referring to FIG. 4, the first pixel PXL1 may include a light emitting device LD, first, second, third, fourth, fifth, sixth and seventh transistors T1, T2, T3, T4, T5, T6 and T7, and a storage capacitor Cst.

An anode of the light emitting device LD may be connected to the first transistor T1 via the sixth transistor T6, and a cathode of the light emitting device LD may be connected to the second power supply line VSS. The light emitting device LD may generate light with a predetermined brightness corresponding to an amount of current supplied from the first transistor T1.

A first power source of the first power supply line VDD may be set to a voltage higher than that of a second power source of the second power supply line VSS.

The seventh transistor T7 may be connected between an initialization power source Vint and the anode of the light emitting device LD. A gate electrode of the seventh transistor T7 may be connected to an ith first scan line S1*i*. The seventh transistor T7 may be turned on when a scan signal is supplied to the ith first scan line S1*i*, to supply the voltage of the initialization power source Vint to the anode of the light emitting device LD. The initialization powersource Vint may be set to a voltage lower than that of a data signal.

The sixth transistor T6 may be connected between the first transistor T1 and the light emitting device LD. A gate electrode of the sixth transistor T6 may be connected to an ith emission control line E1*i*. The sixth transistor T6 may be turned off when an emission control signal is supplied to the ith emission control line E1*i*. The sixth transistor T6 may be turned on when the emission control signal is not supplied to the ith emission control line E1*i*.

The fifth transistor T5 may be connected between the first power supply line VDD and the first transistor T1. A gate electrode of the fifth transistor T5 may be connected to the ith emission control line E1*i*. The fifth transistor T5 may be turned off when an emission control signal is supplied to the ith emission control line E1*i*. The fifth transistor T5 may be turned on when the emission control signal is not supplied to the ith emission control line E1*i*.

A first electrode of the first transistor (e.g., a driving transistor) T1 may be connected to the first power supply line VDD via the fifth transistor T5, and a second electrode of the first transistor T1 may be connected to the anode of the light emitting device LD via the sixth transistor T6. A gate electrode of the first transistor T1 may be connected to a first node N1. The first transistor T1 may control an amount of current flowing from the first power supply line VDD to the second power supply line VSS via the light emitting device LD, according to a voltage of the first node N1.

The third transistor T3 may be connected between the second electrode of the first transistor T1 and the first node N1. A gate electrode of the third transistor T3 may be connected to the ith first scan line S1*i*. The third transistor T3 may be turned on when a scan signal is supplied to the ith first scan line S1*i*, to electrically connect the second electrode of the first transistor T1 to the first node N1. Therefore, the first transistor T1 may be connected in a diode form when the third transistor T3 is turned on.

The fourth transistor T4 may be connected between the first node N1 and the initialization power source Vint. A gate electrode of the fourth transistor T4 may be connected to an (i−1)th first scan line S1*i*-1. The fourth transistor T4 may be turned on when a scan signal is supplied to the (i−1)th first scan line S1*i*-1, to supply the voltage of the initialization power source Vint to the first node N1.

The second transistor T2 may be connected between an mth data line Dm and the first electrode of the first transistor T1. A gate electrode of the second transistor T2 may be connected to the ith first scan line S1*i*. The second transistor T2 may be turned on when a scan signal is supplied to the ith first scan line S1*i*, to electrically connect the mth data line Dm to the first electrode of the first transistor T1.

The storage capacitor Cst may be connected between the first power supply line VDD and the first node N1. The storage capacitor Cst may store a voltage corresponding to the data signal and a threshold voltage of the first transistor T1.

Although a case where the first to seventh transistors T1 to T7 are implemented with a P-type transistor (e.g., a polysilicon semiconductor transistor) is illustrated in FIG. 4, this is merely illustrative, and the present invention is not limited thereto. For example, at least some of the first to seventh transistors T1 to T7 may be implemented with an N-type transistor (e.g., an oxide semiconductor transistor).

Figure 5:
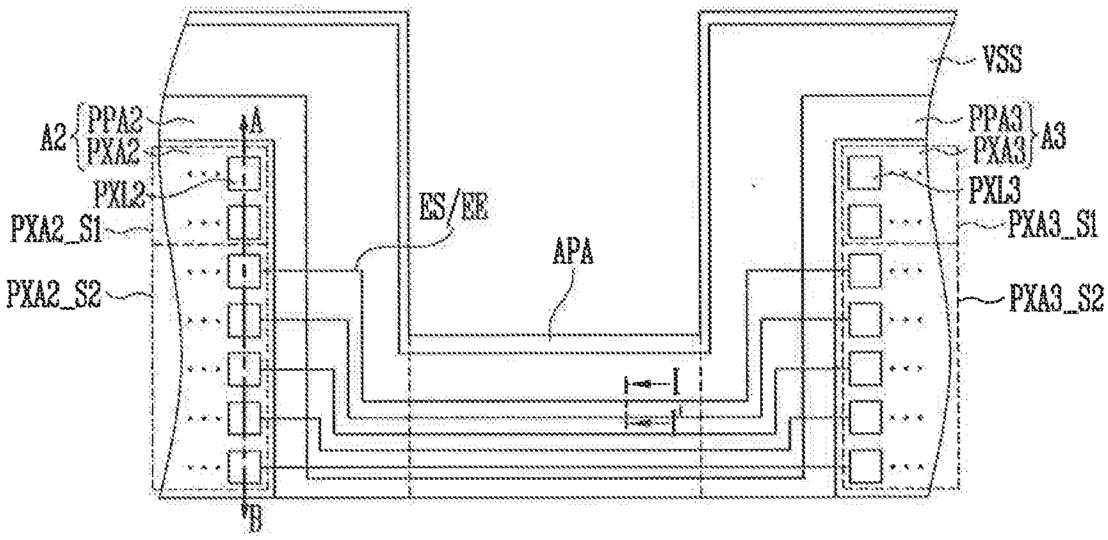
FIG. 5 is a plan view illustrating an example of a notch region included in the display device shown in FIG. 1.
Figure 6:
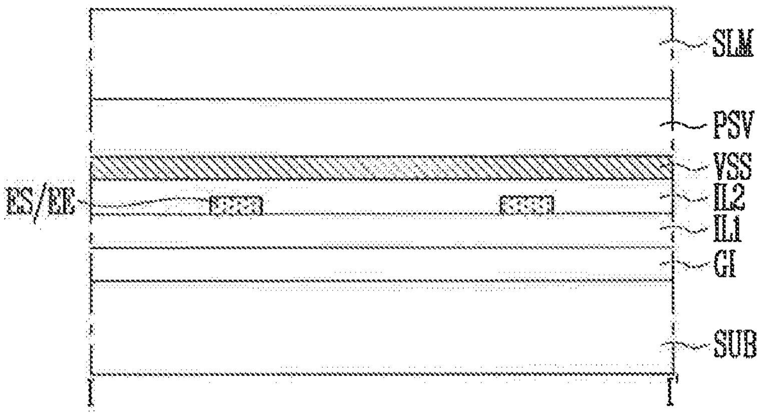
FIG. 6 is a sectional view illustrating an example of the display device taken along line shown in FIG. 5.
Figure 7A:
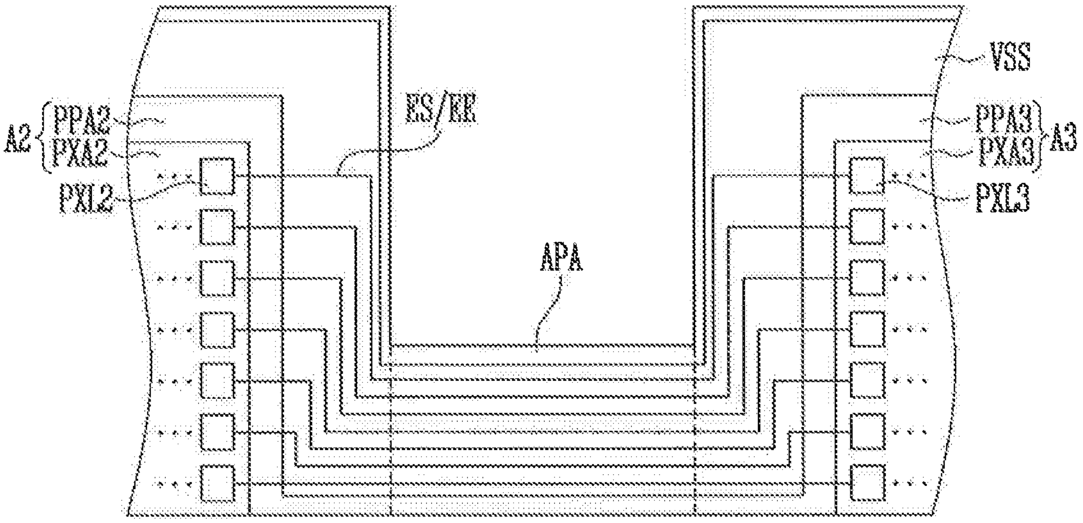
FIGS. 7A and 7B are plan views illustrating another example of the notch region included in the display device shown in FIG. 1.
Figure 7B:
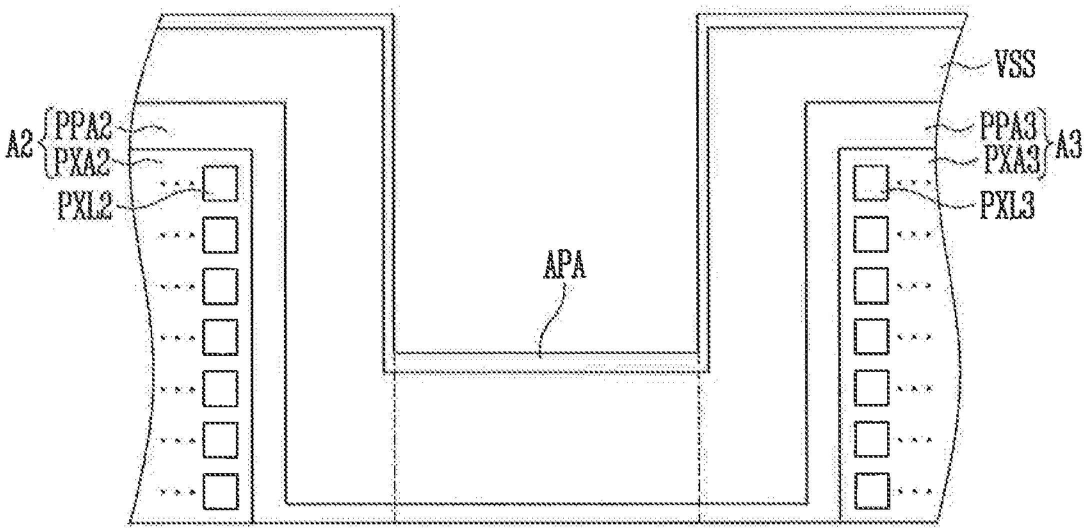

FIG. 5 is a plan view illustrating an example of a notch region included in the display device shown in FIG. 1. A notch region A_N including portions of the second and third regions A2 and A3 with the notch shown in FIG. 1 at the center is illustrated in FIG. 5. FIG. 6 is a sectional view illustrating an example of the display device taken along line shown in FIG. 5. FIGS. 7A and 7B are plan views illustrating another example of the notch region included in the display device shown in FIG. 1.

First, referring to FIGS. 3 and 5, load values of scan lines connected to the second pixel PXL2 of the second region A2 and the third pixel PXL3 of the third region A3 and the first pixel PXL1 of the first region A1, may be different from each other. This is because a number of pixels and a length of scan lines in the second region A2 and the third region A3 are different from those in the first region A1. For example, the load value of scan lines in the first region A1, may be larger than that of scan lines in the second region A2 and the third region A3.

To compensate for a difference in load values between pixel regions, structures having different parasitic capacitances may be applied to the pixel regions by using a dummy part. For example, to compensate for a difference in load values between scan lines in the first pixel region PXA1 and the second and third pixel regions PXA2 and PXA3, a dummy part may be provided in the additional peripheral region APA connecting the second peripheral region PPA2 corresponding to the second pixel region PXA2 to the third peripheral region PPA3 corresponding to the third pixel region PXA3. In addition, the dummy part may not be provided in the first peripheral region PPA1, corresponding to the first pixel region PXA1.

At least one scan line connection part ES connecting the second scan lines S21 and S22 (see FIG. 3) of the second region A2 and the third scan lines S31 and S32 (see FIG. 3) of the third region A3, which are disposed in the same rows, may be provided in the addition peripheral region APA. For example, as shown in FIG. 5, scan line connection parts ES may be provided in the additional peripheral region APA, and some of the second scan lines S21 and S22 (e.g., scan lines connected to second pixels PXL2 included in a second sub-pixel region PXA2_S2 of the second pixel region PXA2) and some of the third scan lines S31 and S32 (e.g., scan lines connected to third pixels PXL3 included in a second sub-pixel region PXA3_S2 of the third pixel region PXA3) may be connected to each other through the scan line connection parts ES. In addition, the other second scan lines S21 and S22 (e.g., scan lines connected to second pixels PXL2 included in a first sub-pixel region PXA2_S1 of the second pixel region PXA2) and the other third scan lines S31 and S32 (e.g., scan lines connected to third pixels PXL3 included in a first sub-pixel region PXA3_S1 of the third pixel region PXA3) are not connected to each other and may be electrically separated from each other. However, the present invention is not limited thereto.

In an example, as shown in FIG. 7A, the second scan lines S21 and S22 (e.g., all scan lines connected to the second pixel PXL2 in the second pixel region PXA2) and the third scan lines S31 and S32 (e.g., all scan lines connected to the third pixels PXL3 in the third pixel region PXA3) may be connected to each other through the scan line connection parts ES. Thus, the load of each of the second and third scan lines S21, S22, S31, and S32 can be structurally compensated by the scan line connection parts ES. However, the width, e.g., a dead space of the additional peripheral region APA may be increased.

In another example, as shown in FIG. 7B, the second scan lines S21 and S22 (e.g., all scan lines connected to the second pixel PXL2*s* in the second pixel region PXA2) and the third scan lines S31 and S32 (e.g., all scan lines connected to the third pixels PXL3 in the third pixel region PXA3) may be electrically separated from each other. Since the scan line connection parts ES do not exist, the width, e.g., dead space of the additional region APA may be decreased. However, the load of each of the second and third scan lines S21, S22, S31, and S32 may not be structurally compensated.

Thus, in the display device in accordance with an exemplary embodiment of the present invention, image data is compensated by using the block-based Mura compensation technique, and corrected image data is generated by cutting off an excessively compensated portion and an insufficiently compensated portion in a boundary region between the first and second regions A1, and A2 (and/or a boundary region between the first and third regions A1, and A3). In this case, a brightness difference caused by load insufficiency of the second and third scan lines S21, S22, S31, and S33 can be compensated even though a separate dummy part (or scan line connection parts ES) does not exist.

Similarly to the scan line connection parts ES, at least one emission control line connection part EE connecting the second emission control lines E21 and E22 (see FIG. 3) of the second region A2 and the third emission control lines E31 and E32 (see FIG. 3) of the third region A3, which are disposed in the same rows, may be provided in the addition peripheral region APA. For example, as shown in FIG. 5, emission control line connection parts EE may be provided in the additional peripheral region APA, and some of the second emission control lines E21 and E22 (e.g., emission control lines connected to second pixels PXL2 included in the second sub-pixel region PXA2_S2 of the second pixel region PXA2) and some of the third emission control lines E31 and E32 (e.g., emission control lines connected to third pixels PXL3 included in a second sub-pixel region PXA3_S2 of the third pixel region PXA3) may be connected to each other through the emission control line connection parts EE. In addition, the other second emission control lines E21 and E22 (e.g., emission control lines connected to second pixels PXL2 included in the first sub-pixel region PXA2_S1 of the second pixel region PXA2) and the other third emission control lines E31 and E32 (e.g., emission control lines connected to third pixels PXL3 included in a first sub-pixel region PXA3_S1 of the third pixel region PXA3) are not connected to each other and may be electrically separated from each other. However, the present invention is not limited thereto. As shown in FIGS. 7A and 7B, the second emission control lines E21 and E22 (e.g., emission control lines connected to second pixels PXL2 included in the second pixel region PXA2) and the third emission control lines E31 and E32 (e.g., emission control lines connected to third pixels PXL3 included in the third pixel region PXA3) may be connected to each other through the emission control line connection parts EE, or may not be connected to each other.

In exemplary embodiments of the present invention, the dummy part may be provided in a region in which the scan line connection parts ES or the emission control line connection parts EE overlap the power supply. The power supply may be one of the first power supply line VDD and the second power supply line VSS. For convenience of description, a case where the dummy part is provided in a region where the scan line connection parts ES or the emission control line connection parts EE overlap the second power supply line VSS is described as an example.

As described with reference to FIG. 1, the second power supply line VSS may be disposed in the second peripheral region PPA2, the third peripheral region PPA3, and the additional peripheral region APA, and surrounds the first to third pixel regions PXA1, PXA2, and PXA3.

The second power supply line VSS at the dummy part may form a parasitic capacitor by overlapping the scan line connection parts ES and the emission control line connection parts EE. The parasitic capacitance of the parasitic capacitor increases a load of the second scan lines S21 and S22 and the third scan lines S31 and S32, so that a load value of the second scan lines S21 and S22 and the third scan lines S31 and S32 can be compensated. As a result, the load value of the second scan lines S21 and S22 and the third scan lines S31 and S32 may be equal or similar to that of the first scan lines S11 to S1*n* (see FIG. 3) of the first pixel region PXA1. The parasitic capacitance formed by the dummy part may be differently set depending on a load value of scan lines to be compensated.

Similarly, the dummy part may compensate a load value of the second emission control lines E21 and E22 of the second pixel region PXA2 and the third emission control lines E31 and E32 of the third pixel region PXA3. For example, the second power supply line VSS and the emission control line connection parts EE may form a parasitic capacitor at the dummy part. The parasitic capacitance of the parasitic capacitor increases a load of the second emission control lines E21 and E22 and the third emission control lines E31 and E32, so that a load value of the second emission control lines E21 and E22 and the third emission control lines E31 and E32 can be compensated. As a result, the load value of the second emission control lines E21 and E22 and the third emission control lines E31 and E32 may be equal or similar to that of the first scan lines S11 to S1*n* (see FIG. 3) of the first pixel region PXA1.

A detailed configuration of the dummy part will be described with reference to FIG. 6.

Referring to FIG. 6, the display device may include a plurality of insulating layers GI, IL1, and IL2, a protective layer PSV, and an encapsulation layer SLM, which are sequentially stacked on the substrate SUB.

The second power supply line VSS described with reference to FIG. 5 may be disposed between the protective layer PSV and a second interlayer insulating layer IL2 among the insulating layers GI, IL1, and IL2. The scan line connection parts ES and the emission line connection parts EE (hereinafter, referred to as connection parts ES/EE or connection lines), which are described with reference to FIG. 5, may be disposed between the insulating layers GI, IL1, and IL2. For example, as shown in FIG. 6, the connection parts ES/EE may be disposed between a first interlayer insulating layer IL1 and the second interlayer insulating layer IL2.

A parasitic capacitor (or load matching capacitor) may be formed at a portion where the second power supply line VSS and each of the connection parts ES/EE overlap each other.

Although a case where the second power supply line VSS is disposed between the second interlayer insulating layer IL2 and the protective layer PSV is illustrated in FIG. 6, the present invention is not limited thereto. For example, the display device may further include a conductive pattern disposed between a gate insulating layer GI and the first interlayer insulating layer IL1. The conductive pattern may be connected to the second power supply line VSS through a separate contact hole. In addition, the conductive pattern may form parasitic capacitors by overlapping the connection parts EE/ES. In addition, the portions where the conductive pattern overlaps the connection parts ES/EE may vary depending on the shape of the conductive pattern (e.g., the shape of the conductive pattern on a plan view), and accordingly, the parasitic capacitances of the parasitic capacitors may be variously set.

As described with reference to FIGS. 5 to 7B, the display device includes parasitic capacitors formed at portions where the power supply (e.g., the second power supply line VSS) and the connection parts ES/EE overlap each other. Therefore, the parasitic capacitances of the parasitic capacitors may be used to compensate a load of the lines (e.g., the scan lines and the emission control lines) of the second and third regions A2 and A3.

Figure 8:
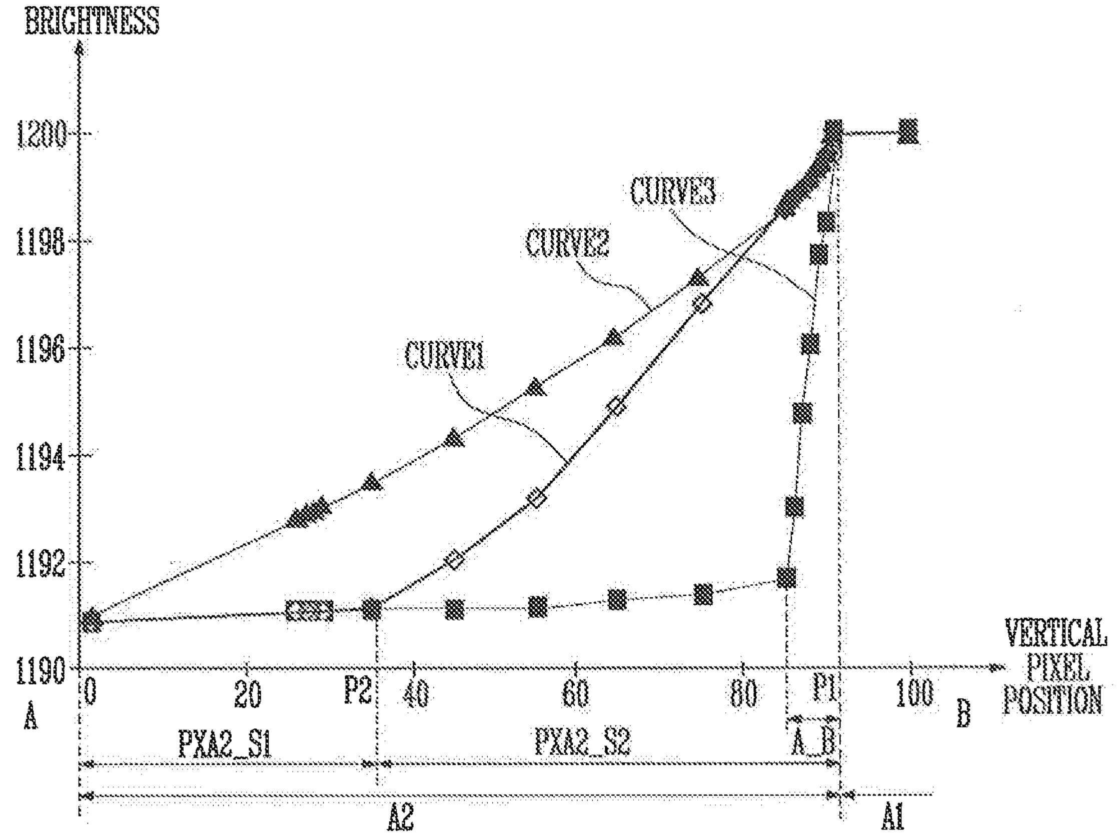
FIG. 8 is a view illustrating a comparison example of brightness measured in the notch region shown in FIG. 5.

FIG. 8 is a view illustrating a comparison example of brightness measured in the notch region shown in FIG. 5.

Referring to FIG. 8, a first curve CURVE1 (e.g., a first brightness curve or a first brightness profile) represents brightness measured along line A-B shown in FIG. 5, when the notch region shown in FIG. 5 emits light or displays an image (e.g., a single grayscale image), corresponding to the same grayscale value (or the same data signal). Similarly, a second curve CURVE2 represents brightness measured in the notch region shown in FIG. 7A, corresponding to the line A-B shown in FIG. 5, and a third curve CURVE3 represents brightness measured in the notch region shown in FIG. 7B, corresponding to the line A-B shown in FIG. 5.

First, according to the third curve CURVE3, brightness at a first point P1 or in a boundary region A_B may be rapidly changed when a measuring point is moved from the first region A1, to the second region A2 of the display device shown in FIG. 7B. The first point P1 is a boundary point between the first region A1, and the second region A2, which are described with reference to FIGS. 3 and 5, and may correspond to a point where a pixel most adjacent to the second region A2 among the first pixels PXL1 in the first region A1, is located. The boundary region A_B may correspond to some pixels (e.g., five rows among a total of 90 rows) most adjacent to the first region A1, among the second pixels PXL2 in the second region A2.

As described with reference to FIGS. 3 and 5, a load of each of the lines in the second region A2 is smaller than that of each of the lines in the first region A1. Therefore, the degree of drop of a signal (or voltage) transferred through the lines in the second region A2 is smaller than the degree of drop of a signal (or voltage) transferred through the lines in the first region A1. In addition, a separate dummy part (or connection parts ES/EE) is not provided as shown in FIG. 7. Hence, brightness in the boundary region A_B may be rapidly changed. Since each of the first and second pixels PXL1 and PXL1 is configured to include the P-type transistors described with reference FIG. 4, brightness in the second region PXA2 may be lower than that in the first region PXA1.

In exemplary embodiments of the present invention, the size (or width) of the boundary region A_B may vary depending on the display device. The boundary region A_B may be set by a brightness profile measured or derived through a separate measuring device in a manufacturing process (e.g., a process of setting a grayscale compensation value for compensating a brightness deviation of pixels as an optical compensation process) of the display device. The information on the boundary region A_B may be stored in a separate memory device in the display device.

Next, according to the second curve CURVE2, brightness may be gradually changed when the measuring point is moved from the first region A1, to the second region A2. This is so, because when a separate dummy part (or connection parts ES/EE) is provided as shown in FIG. 7A, a load of each of the lines in the second region A2 is compensated to be similar to a load of each of the lines in the first region A1, (or a load of an adjacent line).

According to the first curve CURVE1, brightness may be changed when the measuring point is moved from the first region A1, to the second region A2. Brightness in the second sub-pixel region PXA2_S2 (see FIG. 5) between the first point P1 and a second point P2 may be changed, and the rate of change in brightness in the second sub-pixel region PXA2_S2 for the first curve CURVE1 may be larger than the rate of change in brightness for the second curve CURVE2 and smaller than the rate of change in brightness for the third curve CURVE3.

A change in brightness according to the third curve CURVE3 or a change in brightness according to the first curve CURVE1 may be viewed by a user. Thus, in the display device in accordance with an exemplary embodiment of the present invention, a change in brightness according to the third curve CURVE3 or the like is compensated by using the Mura compensation technique, so that a change in brightness between the first and second regions A1, and A2, for example, such as that shown by the second curve CURVE2, can be prevented from being viewed by the user.

Figure 9:
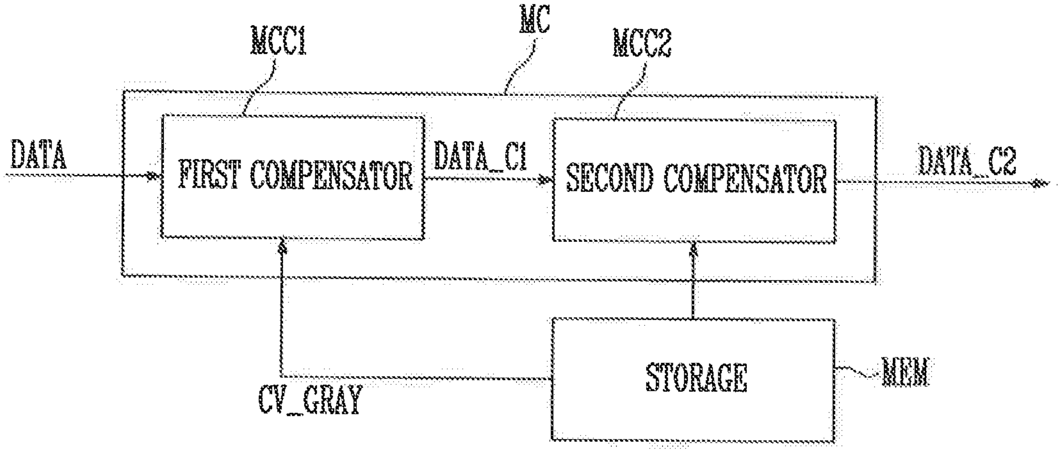
FIG. 9 is a block diagram illustrating an example of a compensator included in the display device shown in FIG. 1.
Figure 10:
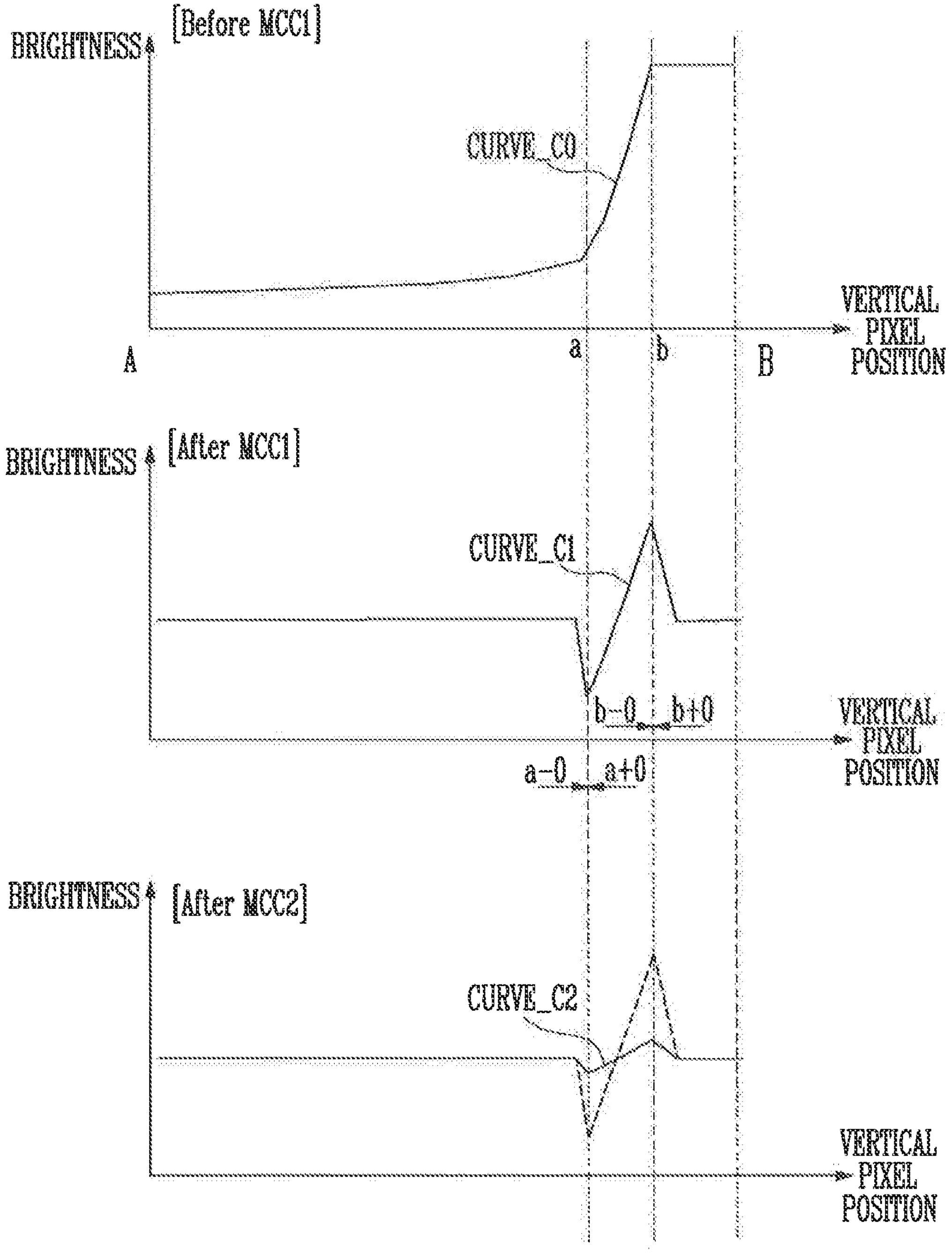
FIG. 10 is a view illustrating a process in which brightness in the notch region shown in FIG. 73 is compensated by the compensator shown in FIG. 9.

FIG. 9 is a block diagram illustrating an example of the compensator included in the display device shown in FIG. 1. FIG. 10 is a view illustrating a process in which brightness in the notch region shown in FIG. 7B is compensated by the compensator shown in FIG. 9.

Referring to FIGS. 7B, 9 and 10, the compensator MC compensates image data (e.g., image data provided from the timing controller TC), by using the block-based Mura compensation technique, and may generate corrected image data by cutting off an excessively compensated portion and an insufficiently compensated portion in the boundary region A_B described with reference to FIG. 8. The data driver DDV (see FIG. 3) may generate a data signal, based on the corrected image data.

The compensator MC may include a first compensator MCC1 and a second compensator MCC2.

The first compensator MCC1 may generate first corrected data DATA_C1 by compensating image data, using the block-based Mura compensation technique.

In an exemplary embodiment of the present invention, the first compensator MCC1 may generate first corrected data DATA_C1 by compensating image data, based on correction values CV_GRAY. The correction values CV_GRAY may be preset in the manufacturing process of the display device, e.g., the optical compensation process, and be pre-stored in a storage MEM provided in the timing controller TC (see FIG. 3), etc.

When the image data is divided into a plurality of blocks, the correction values CV_GRAY may be set for each block.

Each of the blocks may correspond to a plurality of pixels (e.g., at least two of the first and second pixels PXL1 and PXL2). For example, each of the blocks may correspond to 4*4 pixels, 16*16 pixels, etc., depending on the resolution of a brightness measuring device used for optical compensation. In other words, when brightness of the display device is measured for each block, the correction values CV_GRAY may be set for each block.

A brightness deviation between the pixels may be more accurately compensated when the size of the blocks becomes smaller. However, when the size of blocks becomes smaller, cost/time for brightness measurement may increase, and cost for storing the compensation values CV_GRAY (e.g., the capacity of the storage MEM) may also increase. In addition, light emitting characteristics of adjacent pixels may be similar to each other. Therefore, the correction values CV_GRAY may be set for each block having a specific size.

In addition, a correction value with respect to one block may be set with respect to each of a plurality of target brightnesses (e.g., target brightnesses corresponding to grayscales 1, 7, 11, and the like). However, for convenience of description, a case where one correction value is set with respect to one block will be assumed and described hereinafter.

In an exemplary embodiment of the present invention, the first compensator MCC1 may generate correction data by interpolating the correction values CV_GRAY, based on positions of the first and second pixels PXL1 and PXL2 (see FIG. 3), and generate first corrected data DATA_C1 by adding the correction data to image data DATA. The correction data may have the same resolution as the image data DATA.

Since the first compensator MCC1 compensates the image data DATA in units of blocks, the image data DATA in a partial region (e.g., the boundary region described with reference to FIG. 8) may be excessively compensated or insufficiently compensated. An excessively or insufficiently compensated portion causes a change in brightness. The excessively or insufficiently compensated portion may be viewed as a stripe pattern at a boundary between the first and second regions A1, and A2 by a user.

Referring to FIG. 10, a reference curve CURVE_C0, a first compensation curve CURVE_C1, and a second compensation curve CURVE_C2 represent brightness measured along the line A-B shown in FIG. 5, corresponding to the third curve CURVE3 described with reference to FIG. 8.

The reference curve CURVE_C0 represents brightness corresponding to the image data DATA, e.g., the image data DATA that is not compensated by the first compensator MCC1, and may be substantially identical to the third curve CURVE3 shown in FIG. 8. Therefore, duplicated descriptions will not be repeated. According to the reference curve CURVE_0, brightness in a boundary region between a first inflection point a and a second inflection point b may be rapidly changed.

The first compensation curve CURVE_C1 represents brightness corresponding to the first corrected data DATA_C1 compensated by the first compensator MCC1.

According to the first compensation curve CURVE_C1, brightness at the first inflection point a may be lower than brightness at other points, and brightness at the second inflection point b may be higher than brightness at the other points. This is so, because when correction values are calculated in units of blocks by the correction values CV_GRAY, a correction value at the first inflection point a of the first compensation curve CURVE_C1 may be calculated to be smaller than a target correction value due to the influence of a correction value (e.g., a correction value having a relatively small magnitude) with respect to the first region A1. Therefore, brightness in a specific section including the first inflection point a is not sufficiently compensated (e.g., insufficient compensation). In addition, a correction value at the second inflection point b of the first compensation curve CURVE_C1 may be calculated to be greater than a target correction value due to an influence of a correction value (e.g., a correction value having a relatively large magnitude) with respect to the second region A2. Therefore, brightness in a specific section including the second inflection point b is excessively compensated (e.g., excessive compensation).

Referring back to FIG. 9, the second compensator MCC2 may calculate a first limit value and a second limit value, based on a brightness equation (or a bright calculation formula, or a brightness curve) set with respect to the boundary region and the first corrected data DATA_C1, and generate second corrected data DATA_C2 by compensating the first corrected data DATA_C1 (or a portion corresponding to the boundary region A_B among the first corrected data DATA_C1), based on the first and second limit values.

The brightness equation may be an equation that is preset based on brightness of the display device (e.g., brightness in the boundary region), which is actually measured in the manufacturing process (e.g., the optical compensation process) of the display device, and is expressed as a grayscale value and a position (e.g., a position of a pixel in the vertical direction) with respect to, for example, the brightness. The brightness equation may be stored in the storage MEM and provided to the second compensator MCC2. A brightness equation with respect to the entire region of the display device may not be set or is very complicated, and therefore, a brightness equation may be set with respect to only the boundary region of the display device.

On a brightness curve derived according to the brightness equation, the first limit value may be a brightness change value (e.g, a slope of the brightness curve) at a point a−0 (see FIG. 10) at which brightness converges on the first inflection point a from the second region A2, and the second limit value may be a brightness change value at a point b+0 (see FIG. 10) at which brightness converges on the second inflection point b from the first region A1.

In an exemplary embodiment of the present invention, when the difference between the first limit value and the second limit value is within a first reference value, the second compensator MCC2 may constantly set a brightness value in a section between the first inflection point a and the second inflection point b (e.g., the boundary region A_B), and correct a data value (or a grayscale value) corresponding to the boundary region A_B among the first corrected data DATA_C1, based on the brightness curve and the brightness value.

For example, the second compensator MCC2 may calculate a data value in the boundary region A_B by substituting a brightness value and a position (e.g., a position of a pixel in the vertical direction) into the brightness equation, and replace the calculated data value with a data value corresponding to the boundary region A_B among the first corrected data DATA_C1.

In an exemplary embodiment of the present invention, when the difference between the first limit value and the second limit value exceeds the first reference value, the second compensator MCC2 may calculate a third limit value and a fourth limit value, based on the brightness equation and the first corrected data DATA_C1, and generate second corrected data DATA_C2 by compensating the first corrected data DATA_C1 (or a portion corresponding to the boundary region A_B among the first corrected data DATA_C1), based on the first to fourth limit values. The third limit value may be a brightness change value (e.g., a slope of the brightness curve) at a point a+0 at which brightness converges on the first inflection point a from the first region A1, and the fourth limit value may be a brightness change value at a point b−0 at which brightness converges on the second inflection point b from the second region A2.

In an exemplary embodiment of the present invention, when a first difference between the first and third limit values is larger than a second reference value, the second compensator MCC2 may determine that brightness is insufficiently compensated. When a second difference between the second and fourth limit values is larger than the second reference value, the second compensator MCC2 may be determined that brightness is excessively compensated. In other words, the second compensator MCC2 may detect an excessively compensated portion and/or an insufficiently compensated portion of brightness, based on the first difference between the first and third limit values and the second difference between the second and fourth limit values.

In an exemplary embodiment of the present invention, when at least one of the first difference between the first and third limit values and the second difference between the second and fourth limit values is larger than the second reference value, the second compensator MCC2 may set the brightness value in the section between the first inflection point a and the second inflection point b (e.g., the boundary region A_B) by interpolating a first brightness value at the first inflection point a and a second brightness value at the second inflection point b, and correct the data value corresponding to the boundary region A_B among the first corrected data DATA_C1, based on the brightness equation, the first brightness value, and the second brightness value.

For example, the second compensator MCC2 may calculate a brightness value in the boundary region A_B by interpolating the first brightness value and the second brightness value, calculate a data value in the boundary region A_B by substituting a brightness value and a position (e.g., a position of a pixel in the vertical direction) into the brightness equation, and replace the calculated data value with a data value corresponding to the boundary region A_B among the first corrected data DATA_C1.

Referring to FIG. 10, the second compensation curve CURVE_C2 represents brightness corresponding to the second corrected data DATA_C2 compensated by the second compensator MCC2.

According to the second compensation curve CURVE_C2, brightness at the first inflection point a may be higher than brightness at the first inflection point a in the first compensation curve CURVE_C1, and brightness at the second inflection point b may be lower than brightness at the second inflection point b in the first compensation curve CURVE_C1. In other words, the insufficiently compensated brightness and the excessively compensated brightness may be cut off according to the first compensation curve CURVE_C1, and the brightness at the first inflection point a and the brightness at the second inflection point b may have magnitudes similar to those at other points.

As described with reference to FIGS. 9 and 10, the compensator MC (or the display device) compensates image data, using the block-based Mura compensation technique, and generates corrected image data by cutting off an excessively compensated portion and an insufficiently compensated portion in the boundary region A_B between the first and second regions A1, and A2. Thus, although the display device may not include the dummy part (or connection parts ES/EE) described with reference to FIGS. 5 and 6, a rapid change in brightness in the first and second regions A1, and A2 can be reduced. In other words, the display device can emit light with or display an image with roughly uniform brightness in the first and second regions A1, and A2 while minimizing the area of a dead space (e.g., the additional peripheral region APA).

Although a case where the compensator MC compensates brightness in the notch region shown in FIG. 78 is described in FIGS. 9 and 10, the compensator MC is not limited thereto. For example, even when the display device has the structure of the notch region shown in FIG. 5 or the structure of the notch region shown in FIG. 7A, the compensator MC may perform brightness compensation on the boundary region, using a method substantially identical to that of compensating for the brightness in the notch region shown in FIG. 7B.

In addition, although a case where the compensator MC compensates an excessive/insufficient portion of brightness in the boundary region A_B between the first and second regions A1, and A2 is described in FIGS. 9 and 10, the compensator MC is not limited thereto. For example, similarly to the method of compensating the excessive/insufficient portion of brightness in the boundary region A_B the compensator MC may compensate an excessive/insufficient portion of brightness in a boundary region between the first sub-pixel region PXA2_S1 and the second sub-pixel region PXA2_S2, which are described with reference to FIG. 5. In other words, the compensator MC may perform brightness compensation on a portion where an excessive/insufficient portion of brightness occurs or its occurrence is expected, using the block-based Mura compensation technique.

Figure 11:
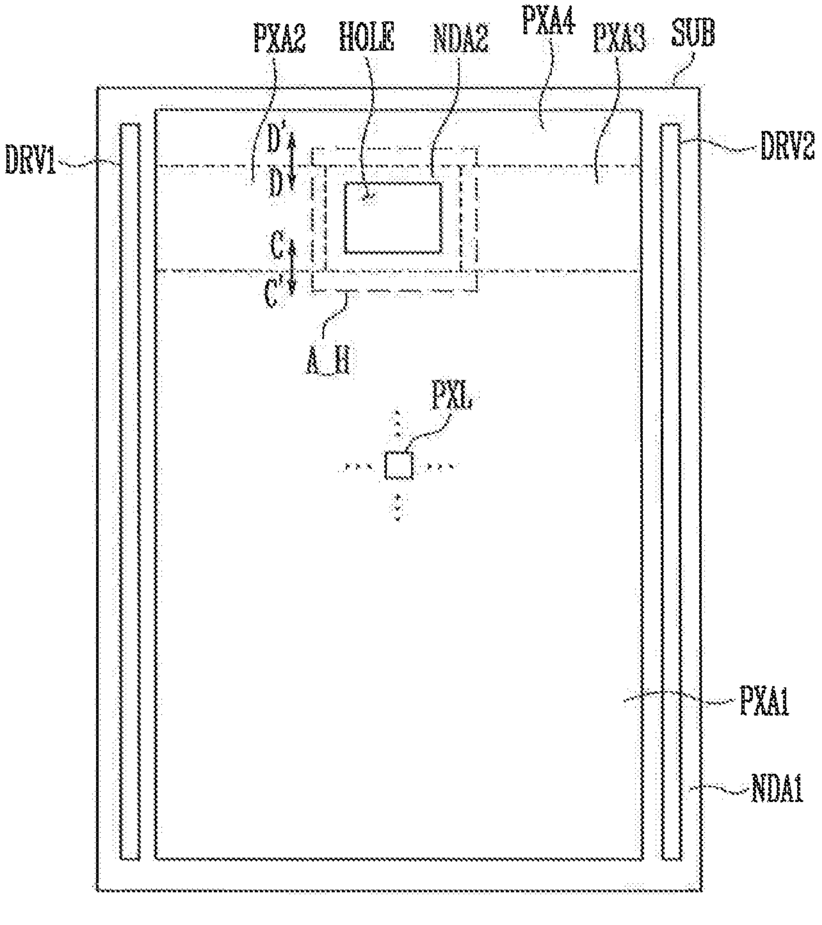
FIG. 11 is a plan view illustrating a display device in accordance with another exemplary embodiment of the present invention.

FIG. 11 is a plan view illustrating a display device in accordance with another exemplary embodiment of the present invention.

Referring to FIGS. 1 and 11, the display device shown in FIG. 11 is different from the display device shown in FIG. 1 in that the display device shown in FIG. 11 includes a hole instead of the notch.

The display device may include a substrate SUB, pixels PXL provided on the substrate SUB, drivers DRV1 and DRV2 provided on the substrate SUB to drive the pixels PXL, and a line part connecting the pixels PXL and the drivers DRV1 and DRV2.

Except for the hole, the substrate SUB may be substantially identical or similar to the substrate SUB described with reference to FIG. 1. The drivers DRV1 and DRV2, the pixels PXL, and the line part are substantially identical to the driver, the pixels PXL1, PXL2, and PLX3, and the line part, which are described with reference to FIGS. 1 to 3, respectively. Therefore, duplicated descriptions will not be repeated.

The hole penetrating the substrate SUB may be formed in an opening region A_H of the substrate SUB. Although a case where the hole has a quadrangular planar shape is illustrated in FIG. 11, this is merely illustrative, and the hole may have a planar shape such as a circular shape, an elliptical shape, or a polygonal shape having a rounded corner.

The substrate SUB may include a pixel region PXA (or a display region) and a first non-pixel region NDA1, (or a first non-display region) that is located along an edge of the pixel region PXA and surrounds the pixel region PXA. The hole may be located in the pixel region PXA, and the substrate SUB may further include a second non-pixel region NDA2 (or a second non-display region) located along an edge of the hole. The first and second non-pixel regions NDA1, and NDA2 may be portions of the substrate SUB, at which any image is not displayed, and the pixel region PXA may surround the second non-pixel region NDA2. The position of the hole may be variously changed.

The pixel region PXA may include first, second, third and fourth pixel regions PXA1, PXA2, PXA3, and PXA4 around the hole (and the drivers DRV1 and DRV2).

The first pixel region PXA1, and the fourth pixel region PXA4 may be portions of the substrate SUB, at which the hole is not formed, between first and second drivers DRV1 and DRV2. For example, the first pixel region PXA1, may be located at a lower side of the hole, and the fourth pixel region PXA4 may be located at an upper side of the hole. The first pixel region PXA1, and the fourth pixel region PXA4 may be substantially identical or similar to the first pixel region PXA1, described with reference to FIG. 1.

The second pixel region PXA2 and the third pixel region PXA3 may be portions separated by the hole between the first and second drivers DRV1 and DRV2. For example, the second pixel region PXA2 may be located at a left side of the hole (e.g., closer to the first driver DRV1) and the third pixel region PXA3 may be located at a right side of the hole (e.g., closer to the second driver DRV2). The second pixel region PXA2 and the third pixel region PXA3 may be substantially identical or similar to the second pixel region PXA2 and the third pixel region PXA3, which are described with reference to FIG. 1, respectively.

As described with reference to FIG. 11 the display device (or the substrate SUB) is provided with the hole. Therefore, a load of a line (e.g., a scan line) connected second pixels PXL2 in the second pixel region PXA2 (and/or third pixels PXL3 in the third pixel region PXA3) may be different from that of a line connected to first pixels PXL1 in the first pixel region PXA1. Therefore, brightness of an image displayed in the second pixel region PXA2 may be different from that of an image displayed in the first pixel region PXA1. In other words, when brightness of the display device is measured along line C-C' (or line D-D') shown in FIG. 11, a rapid change in brightness may occur between the first pixel region PXA1, and the second pixel region PXA2 (or between the second pixel region PXA2 and the fourth pixel region PXA4). Thus, the display device may compensate image data using the compensator MC described with reference to FIGS. 9 and 10. Accordingly, a change in brightness can be compensated, and the area of the second non-display region NDA2 (or dead space) at the periphery of the hole can be minimized.

Figure 12:
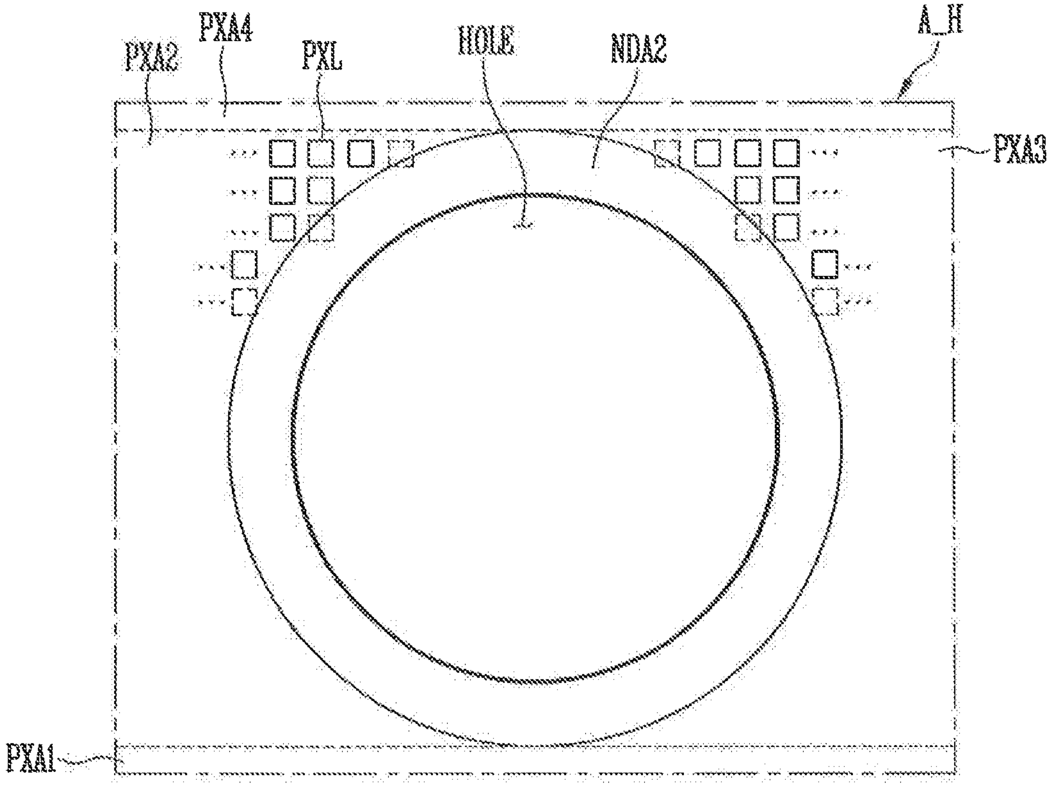
FIG. 12 is a plan view illustrating an example of an opening region included in the display device shown in FIG. 11.

FIG. 12 is a plan view illustrating an example of the opening region included in the display device shown in FIG. 11. In FIG. 12, an opening region A_H is illustrated with respect to the pixels PXL.

Referring to FIG. 12, the opening region A_H may include portions of the first to fourth pixel regions PXA1, to PXA4 and the second non-pixel region NDA2 with a hole at the center. For convenience of description, a case where the hole has a circular shape is illustrated in FIG. 12. In the opening region A_H, the third pixel region PXA3 is symmetric to the second pixel region PXA2 with respect to the hole, and therefore, the second pixel region PXA2 will be mainly described.

In the second pixel region PXA2, the number of second pixels PXL2 may vary depending on rows. A number of pixels PXL disposed in a row adjacent to the first pixel region PXA1, may be greater than that of pixels PXL disposed in a row spaced apart from the first pixel region PXA1. According to the number of pixels PXL, the length of a line connecting the corresponding pixels PXL may vary.

In an exemplary embodiment of the present invention, some of the rows in the second pixel region PXA2 may include the same number of pixels PXL. For example, a number of pixels included in a second row may be equal to a number of pixels included in a third row. A length and a load of a first line (e.g., a first scan line) connected to the pixels of the second row may be substantially equal or similar to a length and a load of a second line (e.g., a second scan line) connected to the pixels of the third row. However, the area of a dead space may be increased by pixels partially disposed up to the second non-pixel region NDA2.

Figure 13A:
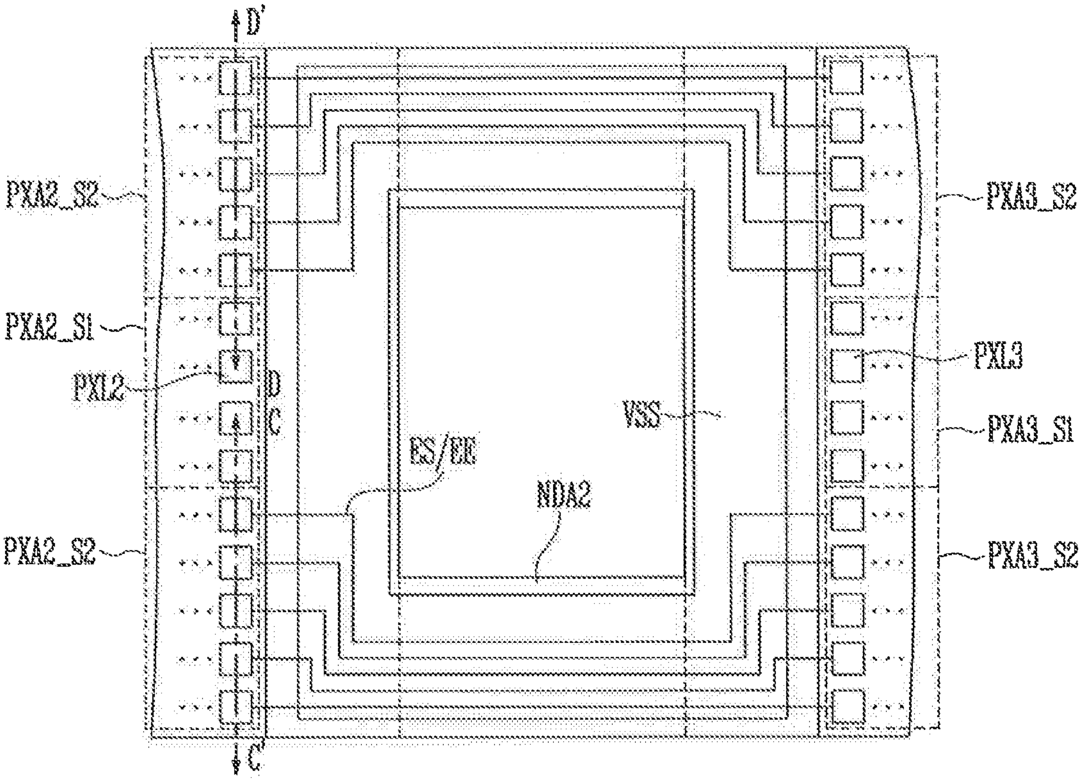
Figure 13B:
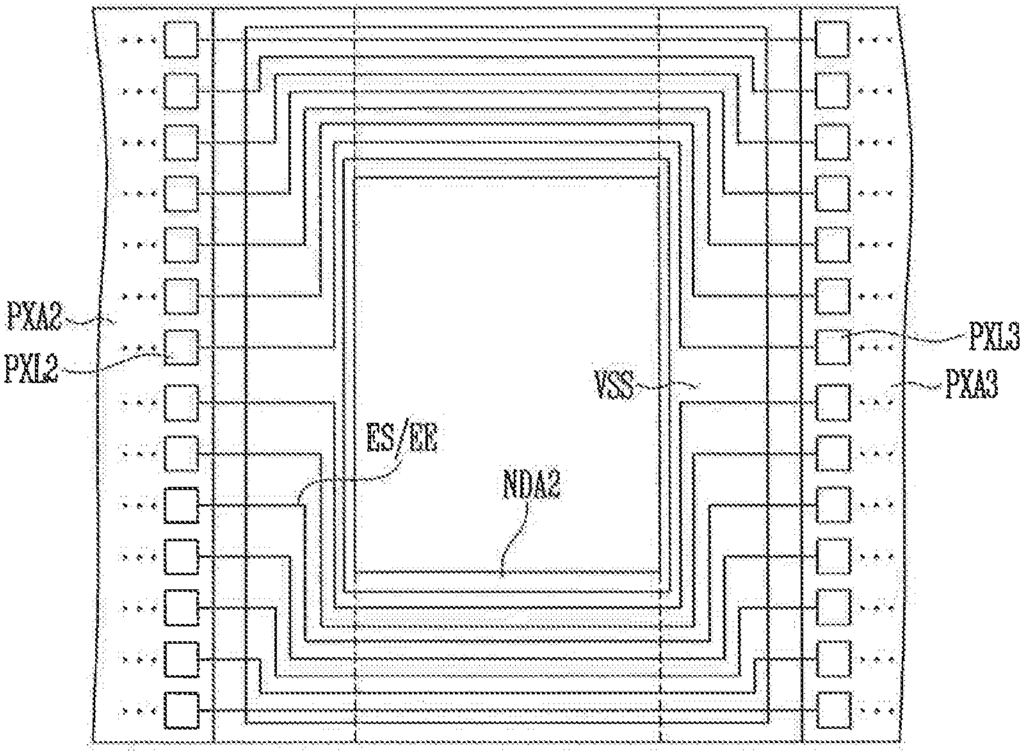
Figure 13C:
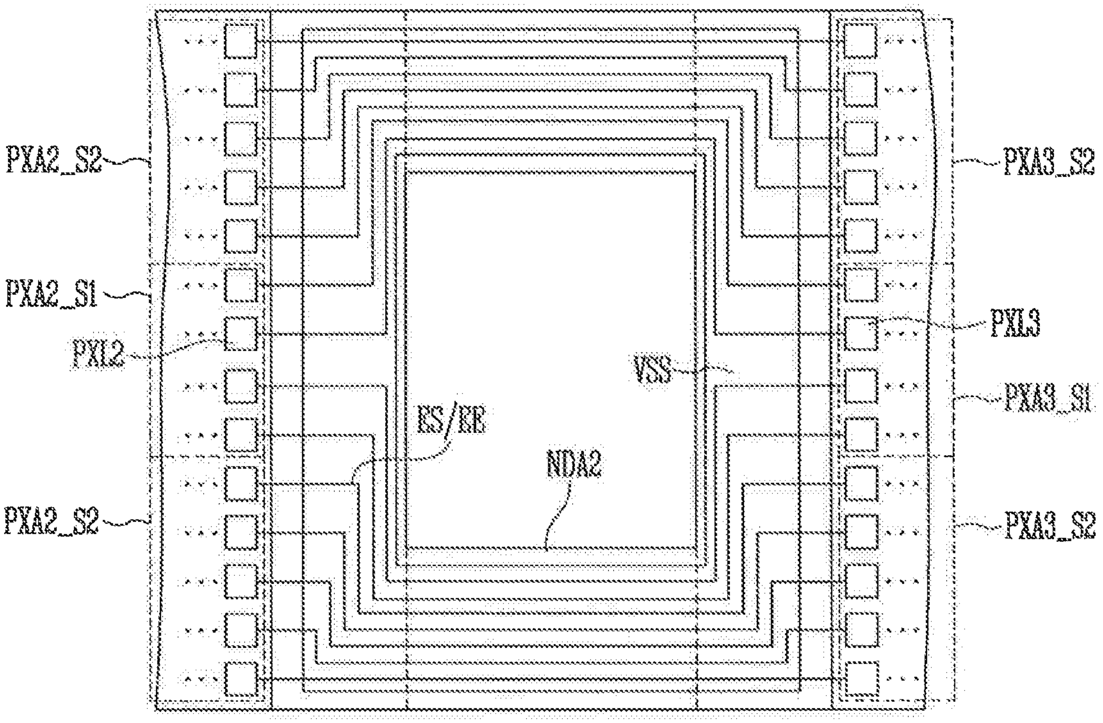

FIGS. 13A to 13C are plan views illustrating other examples of the opening region included in the display device shown in FIG. 11.

First, referring to FIGS. 11 and 13A, an opening region of the display device may include a substrate SUB, pixels PXL2 and PXL3, connection parts ES/EE, and a second power supply line VSS.

The opening region shown in FIG. 13A is vertically symmetric with respect to a horizontal line crossing the center of the area of a hole and a lower portion of the opening region may be substantially identical or similar to the notch region described with reference to FIG. 5. Therefore, duplicated descriptions will not be repeated.

The second power line VSS may be similar to the second power supply line VSS described with reference to FIG. 5. The second power supply line VSS may be disposed in a second non-pixel region NDA2. The second power supply line VSS may constitute a closed loop and surround the hole. The connection parts ES/EE may form parasitic capacitors by partially overlapping the second power supply line VSS.

Thus, a load of lines disposed in a second sub-pixel region PXA2_S2 of a second pixel region PXA2 (e.g., gate lines connected to second pixels PXL2 disposed in the second sub-pixel region PXA2_S2 of the second pixel region PXA2) and a load of lines disposed in a second sub-pixel region PXA3_S2 of a third pixel region PXA3 (e.g., gate lines connected to second pixels PXL2 disposed in the second sub-pixel region PXA3_S2 of the third pixel region PXA3) can be compensated.

Accordingly, brightness measured along line C-C' shown in FIG. 13A can be substantially equal or similar to that in the first curve CURVE1 described with reference to FIG. 8. In addition, brightness measured along line D-D' shown in FIG. 13A can be substantially equal or similar to that in the first curve CURVE1 described with reference to FIG. 8.

Referring to FIG. 13B, an opening region shown in FIG. 13B is vertically symmetric with respect to a horizontal line crossing the center of the area of a hole, and a lower portion of the opening region may be substantially identical or similar to the notch region described with reference to FIG. 7A. Therefore, duplicated descriptions will not be repeated. Thus, brightness measured in the opening region shown in FIG. 13B can be substantially identical or similar to that in the second curve CURVE2 described with reference to FIG. 8.

Referring to FIG. 13C, an opening region shown in FIG. 13 is vertically symmetric with respect to a horizontal line crossing the center of the area of a hole, and a lower portion of the opening region may be substantially identical or similar to the notch region described with reference to FIG. 7B. Therefore, duplicated descriptions will not be repeated. Thus, brightness measured in the opening region shown in FIG. 13C can be substantially identical or similar to that in the third curve CURVE3 described with reference to FIG. 8.

Accordingly, the display device shown in FIG. 11 can compensate a rapid change in brightness in the opening region, using the compensator MC described with reference to FIGS. 9 and 10, and the area of a dead space (e.g., the second non-pixel region NDA2) in the opening region can be minimized.

As described with reference to FIGS. 11 to 13C, a configuration where a change in brightness in a region in which a load of lines is rapidly changed is compensated using the block-based Mura compensation technique can be applied to a display device including the hole.

In accordance with an exemplary embodiment of the present invention, the display device compensates image data, using the block-based Mura compensation technique, and can generate corrected image data by cutting off an excessively compensated portion and an insufficiently compensated portion in a boundary region between first and second regions including lines having different loads. Thus, the display device can provide uniform brightness to the first and second regions even when a separate load matching capacitor is not provided, and an increase in the area of a dead space can be minimized.

While the present invention has been described in connection with exemplary embodiments thereof, it will be understood by those skilled in the art that various modifications and changes can be made thereto without departing from the spirit and scope of the invention as set forth by the appended claims.

What is claimed is:

1. A display device, comprising:

a display unit including a substrate including a first region and a second region located at a side of the first region, wherein first pixels are included in the first region, second pixels are included in the second region, first gate lines in the first region are connected to the first pixels, second gate lines in the second region are connected to the second pixels, and data lines are connected to the first and second pixels;

a gate driver configured to provide a gate signal to the first gate lines and the second gate lines;

a compensator configured to generate first corrected image data by compensating image data for the first and second pixels, based on correction values, and configured to generate second corrected image data by decreasing an over-compensated portion of the first corrected image data and increasing an under-compensated portion of the first corrected image data corresponding to a boundary region between the first region and the second region; and a data driver configured to generate data signals, based on the second corrected image data, and configured to provide the data signals to the data lines, wherein a number of the first pixels connected to each of the first gate lines is greater than a number of the second pixels connected to each of the second gate lines, and wherein the correction values are set for each block, wherein each block corresponds to at least two of the first pixels and at least two of the second pixels.

2. The display device of claim 1, wherein the compensator includes:

a first compensator configured to generate the first corrected image data by compensating the image data, based on the correction values; and a second compensator configured to compute a brightness curve for the boundary region, based on the first corrected image data, and configured to detect and decrease the over-compensated portion of the first corrected image data and detect and increase the under-compensated portion of the first corrected image data, based on the brightness curve.

3. The display device of claim 2, wherein the second compensator calculates a first limit value and a second limit value, using a brightness equation for the boundary region and the first corrected image data, wherein the brightness curve includes a first inflection point adjacent to the first region and a second inflection point adjacent to the second region, wherein the first limit value is a brightness change value at a point where brightness of the first region converges to the first inflection point, and the second limit value is a brightness change value at a point where brightness of the second region converges to the second inflection point.

4. The display device of claim 3, wherein, when a difference between the first limit value and the second limit value is smaller than a first reference value, the second compensator sets a brightness value in an area between the first inflection point and the second inflection point to be constant, and corrects a data value corresponding to the boundary region among the first corrected image data, by using the brightness equation and the brightness value.

5. The display device of claim 4, wherein, when the difference between the first limit value and the second limit value exceeds the first reference value, the second compensator calculates a third limit value and a fourth limit value, by using the brightness equation and the first corrected image data, wherein the third limit value is a brightness change value at a point where the brightness of the second region converges to the first inflection point, and the fourth limit value is a brightness change value at a point where the brightness of the first region converges to the second inflection point.

6. The display device of claim 5, wherein, when at least one of a first difference between the first limit value and the third limit value and a second difference between the second limit value and the fourth limit value is larger than a second reference value, the second compensator sets a brightness value in the area between the first inflection point and the second inflection point by interpolating a first brightness value at the first inflection point and a second brightness value at the second inflection point, and corrects a data value corresponding to the boundary region among the first corrected image data, by using the brightness equation, the first brightness value, and the second brightness value.

7. The display device of claim 2, wherein the first compensator generates correction data corresponding to the image data by interpolating the correction values, and generates the first corrected image data by adding the image data to the correction data.

8. The display device of claim 1, wherein the substrate further includes a third region located at the side of the first region, the third region being spaced apart from the second region, wherein the display unit further includes third pixels in the third region and third gate lines in the third region are connected to the third pixels.

9. The display device of claim 8, wherein the display unit further includes connection lines connecting some of the first gate lines and some of the second gate lines, wherein the connection lines form a parasitic capacitor by being overlapped with a power line.

10. The display device of claim 9, wherein the compensator generates corrected image data by decreasing a brightness of an over-compensated area and increasing a brightness of an under-compensated area in a boundary region between a first sub-region in which the first gate lines that are connected to the second gate lines are disposed and a second sub-region in which the first gate lines that are not connected to the second gate lines are disposed.

11. The display device of claim 8, wherein the display unit further includes connection lines respectively connecting the first gate lines and the second gate lines, wherein the connection lines form a parasitic capacitor by overlapping with a power line.

12. The display device of claim 1, wherein the substrate further includes a hole, wherein the first region and the second region are located along an edge of the hole.

13. The display device of claim 12, wherein the display unit further includes connection lines connected some of the first gate lines, wherein the connection lines are disposed adjacent to the edge of the hole, and form a parasitic capacitor by overlapping with a power line.

14. The display device of claim 12, wherein the display unit further includes connection lines connected to all of the first gate lines, wherein the connection lines are disposed adjacent to the edge of the hole, and form a parasitic capacitor by overlapping with a power line.

15. The display device of claim 12, wherein the substrate further includes a third region located at the side of the first region, the third region being spaced apart from the second region, wherein the display unit further includes third pixels in the third region and third gate lines in the third region are connected to the third pixels.

16. A display device, comprising:

a display unit including a substrate including a first region and a second region located at a side of the first region, wherein first pixels are included in the first region, second pixels are included in the second region, first gate lines in the first region are connected to the first pixels, second gate lines in the second region are connected to the second pixels, and data lines are connected to the first and second pixels;

a first compensator configured to generate first corrected data by compensating image data, based on correction values, wherein the first compensator generates correction data corresponding to the image data by interpolating the correction values, and generates the first corrected data by adding the image data to the correction data; and a second compensator configured to compute a brightness curve for a boundary region between the first region and the second region, based on the first corrected data, and configured to detect and reduce a brightness of a first compensated portion of the first or second pixels and detect and increase a brightness of a second compensated portion of the first or second pixels, based on the brightness curve, wherein a number of the first pixels connected to the first gate lines is greater than a number of the second pixels connected to the second gate lines, wherein the correction values are set for each block corresponding to at least two of the first or second pixels.

17. The display device of claim 16, wherein the second compensator calculates a first limit value and a second limit value, based on a brightness equation for the boundary region and the first corrected data, wherein the brightness curve includes a first inflection point adjacent to the first region and a second inflection point adjacent to the second region, wherein the first limit value is a brightness change value at a point where brightness of the first region converges to the first inflection point, and the second limit value is a brightness change value at a point where brightness of the second region converges to the second inflection point.

18. The display device of claim 17, wherein, when a difference between the first limit value and the second limit value is smaller than a first reference value, the second compensator sets a brightness value in an area between the first inflection point and the second inflection point to be constant, and corrects a data value corresponding to the boundary region among the first corrected data, by using the brightness equation and the brightness value.

19. The display device of claim 18, wherein, when the difference between the first limit value and the second limit value exceeds the first reference value, the second compensator calculates a third limit value and a fourth limit value, by using the brightness equation and the first corrected data, wherein the third limit value is a brightness change value at a point where the brightness of the second region converges to the first inflection point, and the fourth limit value is a brightness change value at a point where the brightness of the first region converges to the second inflection point.

20. The display device of claim 19, wherein, when at least one of a first difference between the first limit value and the third limit value and a second difference between the second limit value and the fourth limit value is larger than a second reference value, the second compensator sets a brightness value in the area between the first inflection point and the second inflection point by interpolating a first brightness value at the first inflection point and a second brightness value at the second inflection point, and corrects a data value corresponding to the boundary region among the first corrected data, by using the brightness equation, the first brightness value, and the second brightness value.

21. A display device, comprising:

a substrate including a first region and a second region adjacent to the first region, wherein first pixels are included in the first region, and second pixels are included in the second region; and a compensator configured to receive image data, generate first corrected data by using correction values, and generate second corrected data by using the first corrected data and a brightness equation, wherein when generating the second corrected data, the compensator decreases a luminance of a first portion of the second pixels disposed adjacent to the first region and increases a luminance of a second portion of the second pixels disposed adjacent to the first region, wherein the substrate further includes a hole, wherein the first region and the second region are located along an edge of the hole, wherein the display device further includes connection lines connected to gate lines, wherein the connection lines are disposed adjacent to the edge of the hole, and form a parasitic capacitor by overlapping with a power line.

* * * * *